United States Patent
Hum et al.

(10) Patent No.: US 8,171,095 B2
(45) Date of Patent: May 1, 2012

(54) SPECULATIVE DISTRIBUTED CONFLICT RESOLUTION FOR A CACHE COHERENCY PROTOCOL

(75) Inventors: Herbert H. J. Hum, Portland, OR (US); James R. Goodman, Madison, WI (US); Robert H. Beers, Hillsboro, OR (US); Rajnish Ghughal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/047,496

(22) Filed: Mar. 14, 2011

(65) Prior Publication Data
US 2011/0161451 A1    Jun. 30, 2011

Related U.S. Application Data

(63) Continuation of application No. 10/325,427, filed on Dec. 19, 2002, now Pat. No. 7,917,646.

(51) Int. Cl.
*G06F 15/16* (2006.01)
(52) U.S. Cl. ........................................ 709/206; 709/232
(58) Field of Classification Search .................. 709/206, 709/208, 232; 711/146
See application file for complete search history.

(56) References Cited

U.S. PATENT DOCUMENTS

| | | | |
|---|---|---|---|
| 5,297,269 A | 3/1994 | Donaldson et al. | |
| 5,463,629 A | 10/1995 | Ko | |
| 5,557,767 A | 9/1996 | Sukegawa | |
| 5,623,644 A | 4/1997 | Self et al. | |
| 5,664,149 A | 9/1997 | Martinez, Jr. et al. | |
| 5,819,296 A | 10/1998 | Anderson et al. | |
| 5,860,111 A | 1/1999 | Martinez, Jr. et al. | |
| 6,009,488 A | 12/1999 | Kavipurapu | |
| 6,067,611 A | 5/2000 | Carpenter et al. | |
| 6,085,276 A | 7/2000 | VanDoren et al. | |
| 6,092,155 A | 7/2000 | Olnowich | |

(Continued)

FOREIGN PATENT DOCUMENTS
EP    1582983    5/2005
(Continued)

OTHER PUBLICATIONS

*The Authoritative Dictionary of IEEE Standard Terms 7th Edition*, The Institute of Electrical and Electronics Engineers, Inc., pp. 217, 574, and 882, 2000.

(Continued)

*Primary Examiner* — Douglas Blair
*Assistant Examiner* — Bradford F Fritz
(74) *Attorney, Agent, or Firm* — Blakely, Sokoloff, Taylor & Zafman LLP

(57) ABSTRACT

A conflict resolution technique provides consistency such that all conflicts can be detected by at least one of the conflicting requestors if each node monitors all requests after that node has made its own request. If a line is in the Exclusive, Modified or Forward state, conflicts are resolved at the node holding the unique copy. The winner of the conflict resolution, and possibly the losers, report the conflict to the home node, which pairs conflict reports and issues forwarding instructions to assure that all requesting nodes eventually receive the requested data. If a requested cache line is either uncached or present only in the Shared state, the home node provides a copy of the cache node and resolves conflicts. In one embodiment, a blackout period after all responses until an acknowledgement message has been received allows all conflicting nodes to be aware of conflicts in which they are involved.

16 Claims, 27 Drawing Sheets

U.S. PATENT DOCUMENTS

| | | | |
|---|---|---|---|
| 6,189,043 | B1 | 2/2001 | Buyukkoc et al. |
| 6,263,409 | B1 | 7/2001 | Haupt et al. |
| 6,275,905 | B1 | 8/2001 | Keller et al. |
| 6,275,907 | B1 | 8/2001 | Baumgartner et al. |
| 6,338,122 | B1 | 1/2002 | Baumgartner et al. |
| 6,341,337 | B1 | 1/2002 | Pong |
| 6,405,289 | B1 | 6/2002 | Arimilli et al. |
| 6,430,657 | B1 | 8/2002 | Mittal et al. |
| 6,442,597 | B1 | 8/2002 | Deshpande et al. |
| 6,457,100 | B1 | 9/2002 | Ignatowski et al. |
| 6,477,535 | B1 | 11/2002 | Mirzadeh |
| 6,478,498 | B1 | 11/2002 | Miyasaka et al. |
| 6,484,220 | B1 | 11/2002 | Alvarez, II et al. |
| 6,493,809 | B1 | 12/2002 | Safranek et al. |
| 6,578,116 | B2 | 6/2003 | Bachand et al. |
| 6,594,733 | B1 | 7/2003 | Cardente |
| 6,631,447 | B1 | 10/2003 | Morioka et al. |
| 6,631,449 | B1 | 10/2003 | Borrill |
| 6,636,944 | B1 | 10/2003 | Gilbert et al. |
| 6,640,287 | B2 | 10/2003 | Gharachorloo et al. |
| 6,691,192 | B2 | 2/2004 | Ajanovic et al. |
| 6,728,841 | B2 | 4/2004 | Keller |
| 6,760,728 | B1 | 7/2004 | Osborn |
| 6,769,017 | B1 | 7/2004 | Bhat et al. |
| 6,795,900 | B1 | 9/2004 | Miller et al. |
| 6,826,591 | B2 | 11/2004 | French et al. |
| 6,874,053 | B2 | 3/2005 | Yasuda et al. |
| 6,877,026 | B2 | 4/2005 | Smith et al. |
| 6,877,030 | B2 | 4/2005 | Deneroff |
| 6,901,485 | B2 | 5/2005 | Arimilli et al. |
| 6,922,755 | B1 | 7/2005 | Safranek et al. |
| 6,926,591 | B2 | 8/2005 | Horsky et al. |
| 6,934,814 | B2 | 8/2005 | Glasco et al. |
| 6,941,440 | B2 | 9/2005 | Moll et al. |
| 6,944,719 | B2 | 9/2005 | Rowlands et al. |
| 6,954,829 | B2 | 10/2005 | Hum et al. |
| 6,968,425 | B2 | 11/2005 | Hashimoto |
| 7,062,541 | B1 | 6/2006 | Cannon et al. |
| 7,111,128 | B2 | 9/2006 | Hum et al. |
| 7,130,969 | B2 | 10/2006 | Hum et al. |
| 7,209,976 | B2 | 4/2007 | Folkes et al. |
| 7,269,698 | B2 | 9/2007 | Hum et al. |
| 7,360,033 | B2 | 4/2008 | Hum et al. |
| 2002/0087804 | A1 | 7/2002 | Khare et al. |
| 2002/0087809 | A1 | 7/2002 | Arimilli et al. |
| 2002/0129211 | A1 | 9/2002 | Arimilli et al. |
| 2002/0178210 | A1 | 11/2002 | Khare et al. |
| 2003/0074430 | A1 | 4/2003 | Gieseke et al. |
| 2003/0097529 | A1 | 5/2003 | Arimilli et al. |
| 2004/0068620 | A1 | 4/2004 | Van Doren et al. |
| 2004/0123045 | A1 | 6/2004 | Hum et al. |
| 2004/0123052 | A1 | 6/2004 | Beers et al. |
| 2005/0160231 | A1 | 7/2005 | Van Doren et al. |
| 2005/0198440 | A1 | 9/2005 | Van Doren et al. |

FOREIGN PATENT DOCUMENTS

| | | |
|---|---|---|
| EP | 1443404 | 3/2007 |
| GB | 20020087804 | 7/2002 |

OTHER PUBLICATIONS

Wikipedia, "Dynamic Random Access Memory," Revision as of Mar. 31, 2003, http://en.wikipedia.org/wiki/Dynamic_access_memory.
Office Action from U.S. Appl. No. 11/447,384 mailed Aug. 22, 2006, 8 pgs.
Notice of Allowance for U.S. Appl. No. 11/069,848 mailed May 8, 2008, 10 pgs.
Notice of Allowance for U.S. Appl. No. 11/447,384 mailed Nov. 28, 2007, 6 pgs.
Notice of Allowance for U.S. Appl. No. 11/482,673 mailed Apr. 8, 2008, 7 pgs.
Notice of Allowance for U.S. Appl. No. 11/069,848 mailed May 8, 2007, 10 pgs.
Notice of Allowance for U.S. Appl. No. 10/833,963 mailed Jul. 10, 2008, 7 pgs.
Combined Search and Examination Report for GB Patent Application No. GB0802718.7 mailed Jun. 30, 2008, 7 pgs.
Office Action from U.S. Appl. No. 10/833,963 mailed Oct. 6, 2008, 11 pgs.
Office Action from U.S. Appl. No. 10/325,427 mailed May 1, 2007, 13 pgs.
European Search Report for EP Pat App No. EP03257787 mailed Feb. 23, 2007, 35 pgs.
Office Action from U.S. Appl. No. 10/833,965 mailed Sep. 21, 2007, 14 pgs.
Office Action from U.S. Appl. No. 10/833,977 mailed Oct. 9, 2007, 8 pgs.
Office Action from U.S. Appl. No. 10/833,963 mailed Dec. 17, 2007, 12 pgs.
Notice of Preliminary Rejection for Korean Patent Application No. 10-2006-7022561 mailed Nov. 21, 2007, 4 pgs.
Notice of Preliminary Rejection for Korean Patent Application No. 10-2006-7022561 mailed May 20, 2008, 2 pgs.
Final Office Action from U.S. Appl. No. 10/325,427 mailed Dec. 8, 2008, 16 pgs.
Final Office Action from U.S. Appl. No. 10/833,977 mailed Jun. 23, 2009, 11 pgs.
Office Action from U.S. Appl. No. 10/325,427 mailed May 27, 2009, 17 pgs.
Office Action for German Patent Application No. 11 2005 000 974. 2-53 mailed Apr. 2, 2009, 4 pgs.
Office Action from U.S. Appl. No. 10/833,963 mailed Aug. 5, 2009, 22 pgs.
Office Action for German Patent Application No. 10393919.9-53 Dated Mar. 27, 2009, 3 pages.
Notice of Preliminary Rejection for Korean Patent Application No. 10-2006-7022561 Mailed Nov. 21, 2007, 4 pages.
Notice of Preliminary Rejection for Korean Patent Application No. 10-2006-7022561 Mailed May 20, 2008, 2 pages.
Office Action for German Patent Application No. 10393919.9-53 dated Mar. 27, 2009; 3 pages.
Final Office Action from U.S. Appl. No. 10/833,965 mailed Mar. 19, 2009, 16 pgs.
Final Office Action from U.S. Appl. No. 10/325,427 mailed Jan. 12, 2010, 11 pgs.
Office Action for Japanese Patent Application No. P2007-509505 mailed Feb. 15, 2010, 20 pgs.
"OA Mailed Mar. 18, 2008 for U.S. Appl. No. 10/325,427", Whole Document.
"OA Mailed May 5, 2009 for German Patent Application 10 393 919.9-53", Whole Document.
"OA Mailed Sep. 3, 2007 for German Patent Application 10 393 919.9-53", Whole Document.
"OA Mailed Jun. 6, 2008 for JP Patent Application 2004-565115", Whole Document.
"OA Mailed Aug. 14, 2006 for KR Patent Application 10-2004-7011395", Whole Document.
"European Search Report for EP Patent App No. EP03257787 Mailed Feb. 23, 2007", 35 Pages.
"Final Office Action from U.S. Appl. No. 10/833,965 mailed May 31, 2007, 22 pgs."
"Office Action for U.S. Appl. No. 10/833,977 mailed Oct. 9, 2007", 8 pages.
"Office Action German Patent Application No. 11 2005 000 974.2-53 Dated Apr. 2, 2009", 4 pages.
Ahmed, Hamdy S., "Office Action", (Dec. 26, 2006), 12 pages.
"OA for U.S. Appl. No. 10/325,427", (Dec. 4, 2006).
Azimi, M , et al., "Scalability Port: A Coherent Interface for Shared Memory Multiprocessors", *High Performance Interconnects IEEE*, (Aug. 21, 2002), 65-70.
Cen, Ling , "PCT/US2005/012087 International Preliminary Report", (Nov. 9, 2006), 12 pages.
Cen, Ling , "PCT/US2005/012087 Search Report", (Oct. 28, 2005), 18 pages.
Ender, Bilir E., et al., "Multicast Snooping: A New Coherence Method Using a Multicast Address Network", *Computer Architecture News*, (May 1999), 294-304.

Handy, Jim, "The Cache Memory Book", 1998, *Academic Press Inc*, 2nd Edition, pp. 60, vii-229, (1998), 3 Pages.

IEEE, "Standard for scalable coherent interface (SCI)", *IEEE Std 1596-1992*, Institute of Electrical and Electronics Engineers, Inc. USA, (1992), i-243.

Lenoski, Daniel, et al., "The Directory-Based Cache Coherence Protocol for the DASH Multiprocessor", *Computer Architecture, 1990 Proceedings. 17th Annual International*, May 28-31, 1990., pp. 148-159.

Lilja, DJ, "Cache Coherence in Large Scale Shared Memory Multiprocessors: Issues and Comparisions", *ACM Computing Surveys*, (Sep. 2003), 303-338.

"Search Report for PCT/US 03/37782", (Jan. 9, 2006).

Rajwar, R, et al., "Improving the Throughput of Synchronization by Insertion of Delays", *High-Performance Computer Architecture, IEEE Computer Soc*, (Jan. 8, 2000), 168-179.

Santori, Gabriele, "Hypertransport Technology", *"HyperTransport Technology Overview & Consortium Announcement,"* Platform Conference, Jul. 24-25, 2001., Platform Conference, 19 pages.

Sartori, Gabriele, "Hypertransport Technology", *"HyperTransport Technology"*, Platform Conference, Jul. 24-25, 2001, 10 pages.

Sun Microsystems, "Ultrasparc User's Manual", *ULTRASPARC I, ULTRASPARC II*, (Jul. 1997), iii-394.

Tendler, et al., Tendler et al., *POWER4 System Microarchecture Technical White Paper, IBM Server Group*, Oct. 2001, pp. 1-6.

USPTO, "FOA Mailed Dec. 8, 2008 for U.S. Appl. No. 10/325,427", Whole Document.

ing of the invention. It will be apparent, however, to one
SPECULATIVE DISTRIBUTED CONFLICT RESOLUTION FOR A CACHE COHERENCY PROTOCOL

RELATED APPLICATIONS

This application is a Continuation of U.S. application Ser. No. 10/325,427, entitled Speculative Distributed Conflict Resolution For A Cache Coherency Protocol, filed on Dec. 19, 2002, now issued as U.S. Pat. No. 7,917,646, and priority is claimed thereof.

FIELD

The invention relates to cache memories. More particularly, the invention relates to distributed conflict resolution in a multi-cache multiprocessor system.

BACKGROUND

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases, reliance on a single component for conflict resolution can decrease overall system performance.

FIGS. 1a through 1e provide a conceptual illustration of a conflict condition in a multi-node system. Nodes 110, 120 and 130 are peer nodes that can store a copy of the requested data (e.g., a cache line) in cache memory. Home node 140 is the Home (H) node for the requested data. In the example of FIGS. 1a through 1e, peer nodes 110 and 120 store an invalid copy, or no copy, of the requested data and peer node 130 stores a modified copy of the requested data that has not been written back to memory. The Home node stores the original copy of the data in memory or modified versions of the data when the modifications are written back to memory.

As illustrated in FIG. 1a, peer node 120 transmits a Data Request message to request a copy of a block of data, for example, a cache line. The Data Request message is transmitted to peer node 110 and to peer node 130. However, the Data Request message to peer node 130 is delayed. The delay can be caused, for example, by lack of available bandwidth, buffering considerations, etc.

Peer node 110 responds to the Data Request message from peer node 120 with a No Valid Copy message, which indicates to peer node 120 that peer node 110 does not have a valid copy of the requested data. At some time after peer node 120 transmits Data Request messages, Peer node 110 transmits Data Request messages to peer nodes 120 and 130, as illustrated in FIG. 1c, requesting the same data as was requested by peer node 120.

Peer node 120 provides a No Valid Copy message to peer node 110 in response to the Data Request message. Peer node 130 provides the requested data to peer node 110. The copy of the data, if any, maintained by peer node 130 is marked invalid and the copy of the data stored by peer node 110 is marked Modified.

At some time after peer node 130 has responded to the Data Request from peer node 110 and invalidated the copy of the data, peer node 130 receives the delayed Data Request message from peer node 120, as illustrated in FIG. 1c. In response to the Data Request message, peer node 130 provides a No Valid Copy message to peer node 120. Note that the state of the data stored by peer node 130 changed from the time of the original Data Request message to the time the peer node 130 responds to the Data Request message.

Because peer nodes 110 and 130 respond to the Data Request message from peer node 120 with No Valid Copy messages, peer node 120, finding no valid cached copy of the requested data, requests a copy of the data from home node 140. Thus, as illustrated in FIG. 1d, peer node transmits a Read message to home node 140. Home node 140 retrieves the requested data from memory and provides the data to peer node 120. Peer node 120 then stores the requested data in the Exclusive state.

As illustrated in FIG. 1e, the sequence of messages illustrated in FIGS. 1a through 1e result in two incompatible copies of a data line. In the example provided peer node 110 stores a copy of the data in the Modified state and peer node 120 stores a copy of the data in the Exclusive state. However, the copy stored by peer node 120 is not exclusive to peer node 120. Thus, multi-node systems can result in incompatible copies of data under certain circumstances unless a mechanism is provided to resolve cache conflicts.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1A:
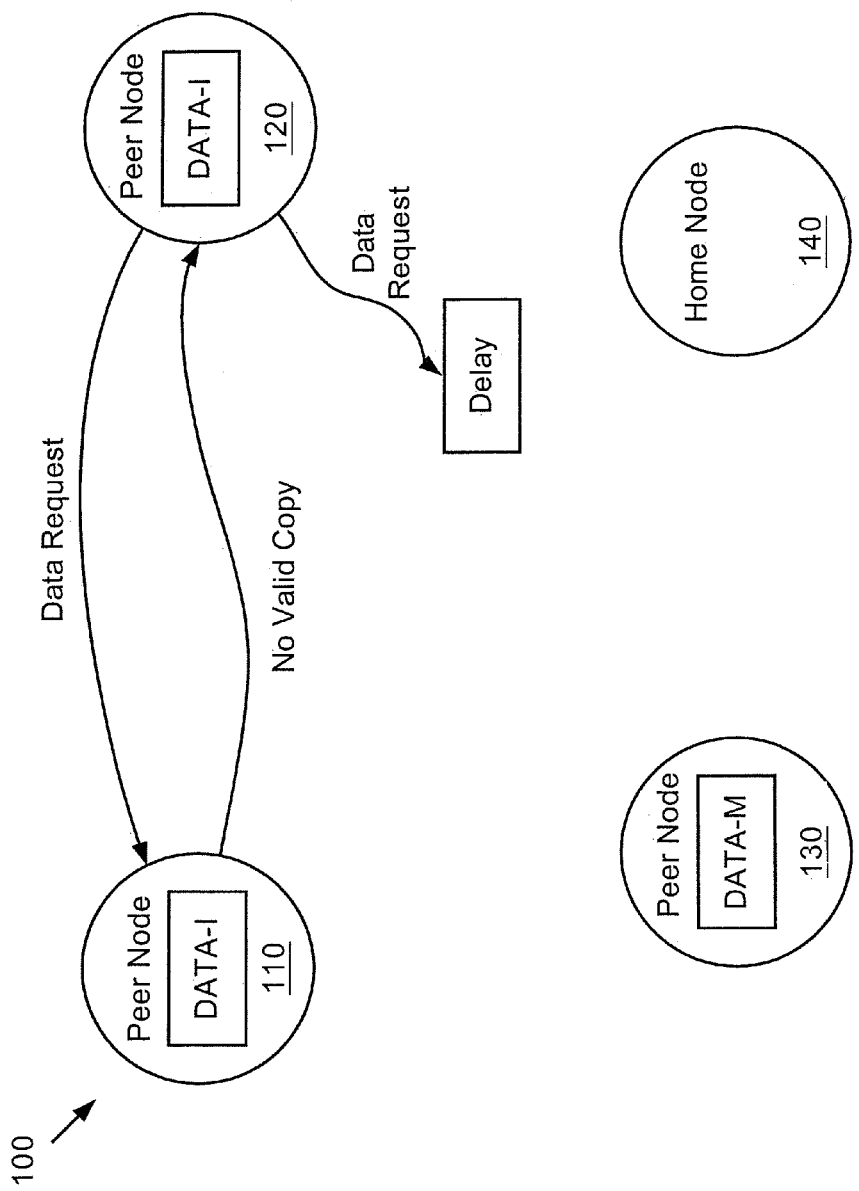
FIGS. 1a through 1e provide a conceptual illustration of a conflict condition in a multi-node system.
Figure 1B:
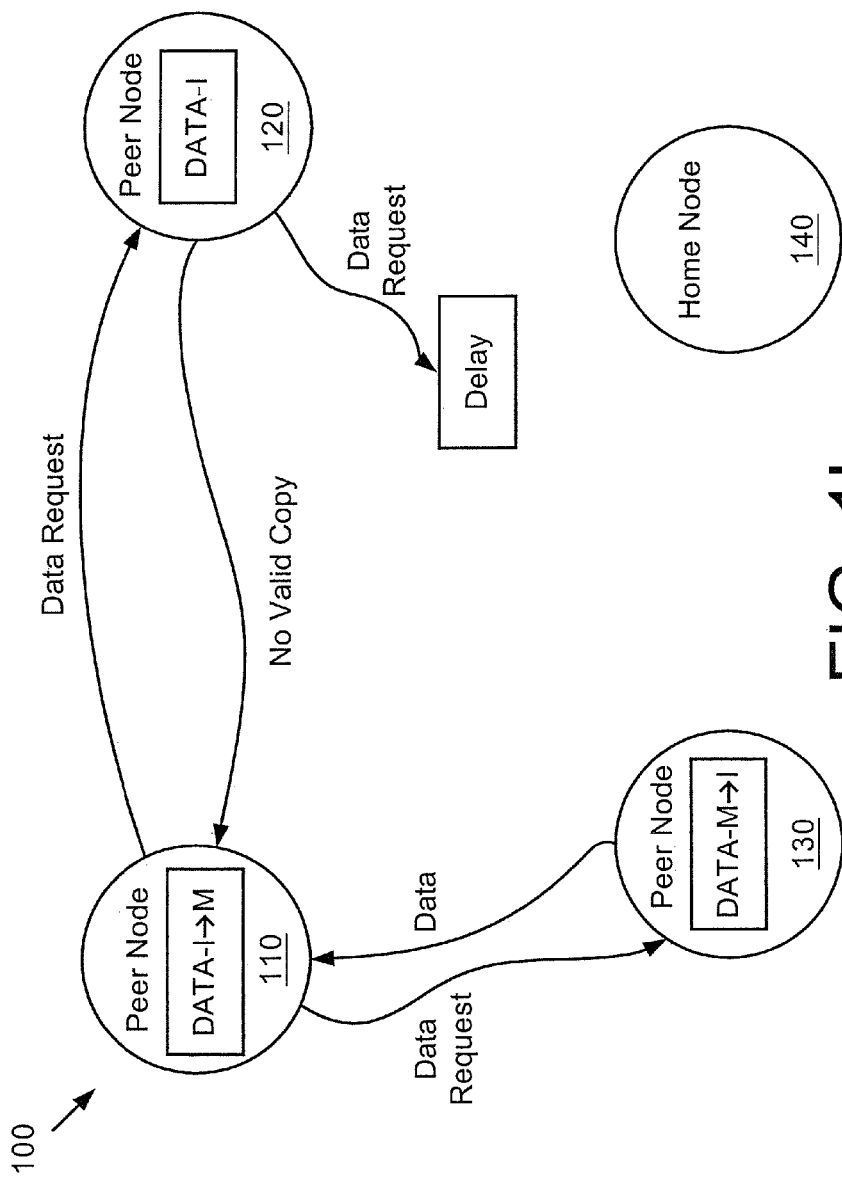
Figure 1C:
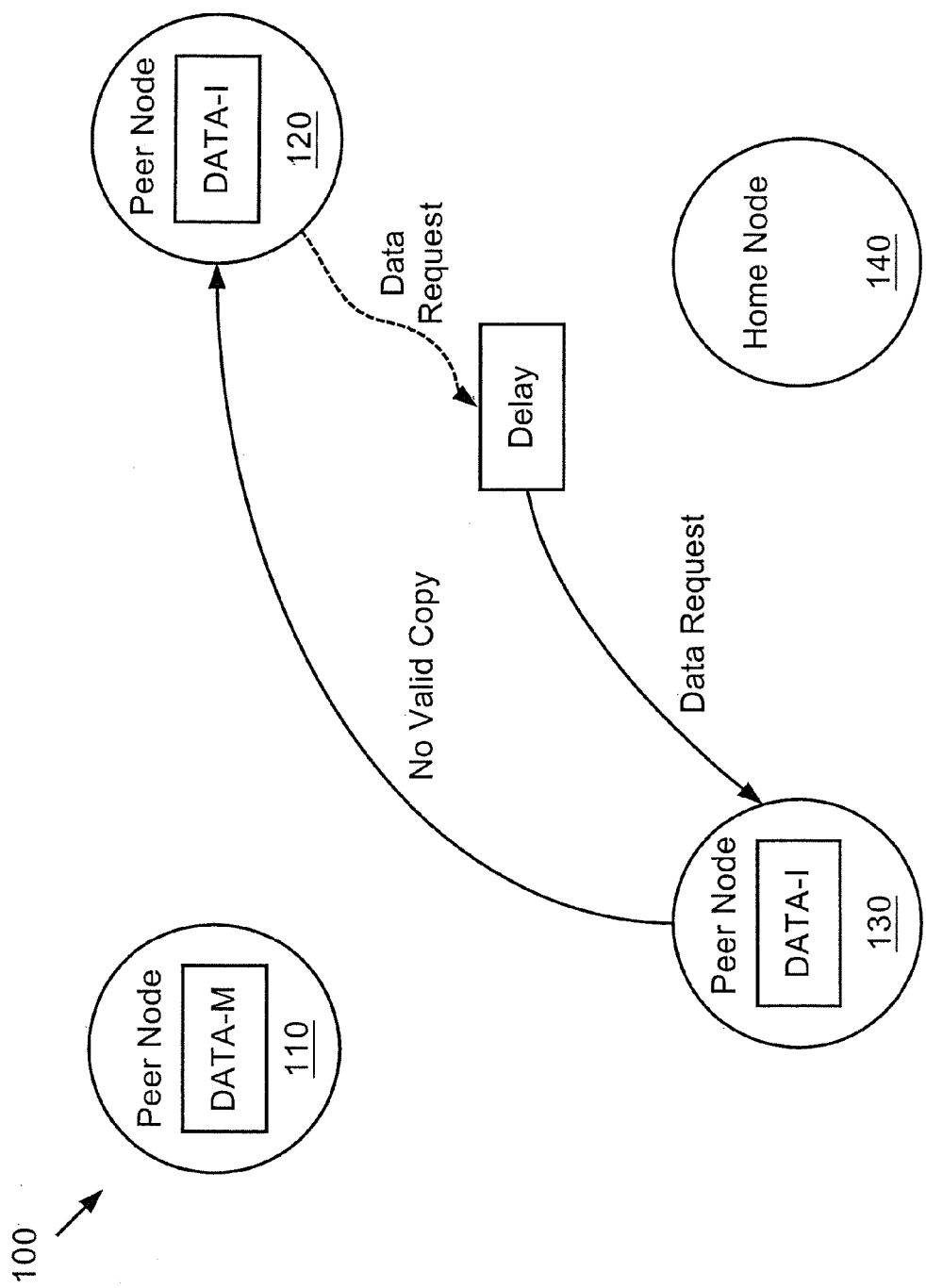
Figure 1D:
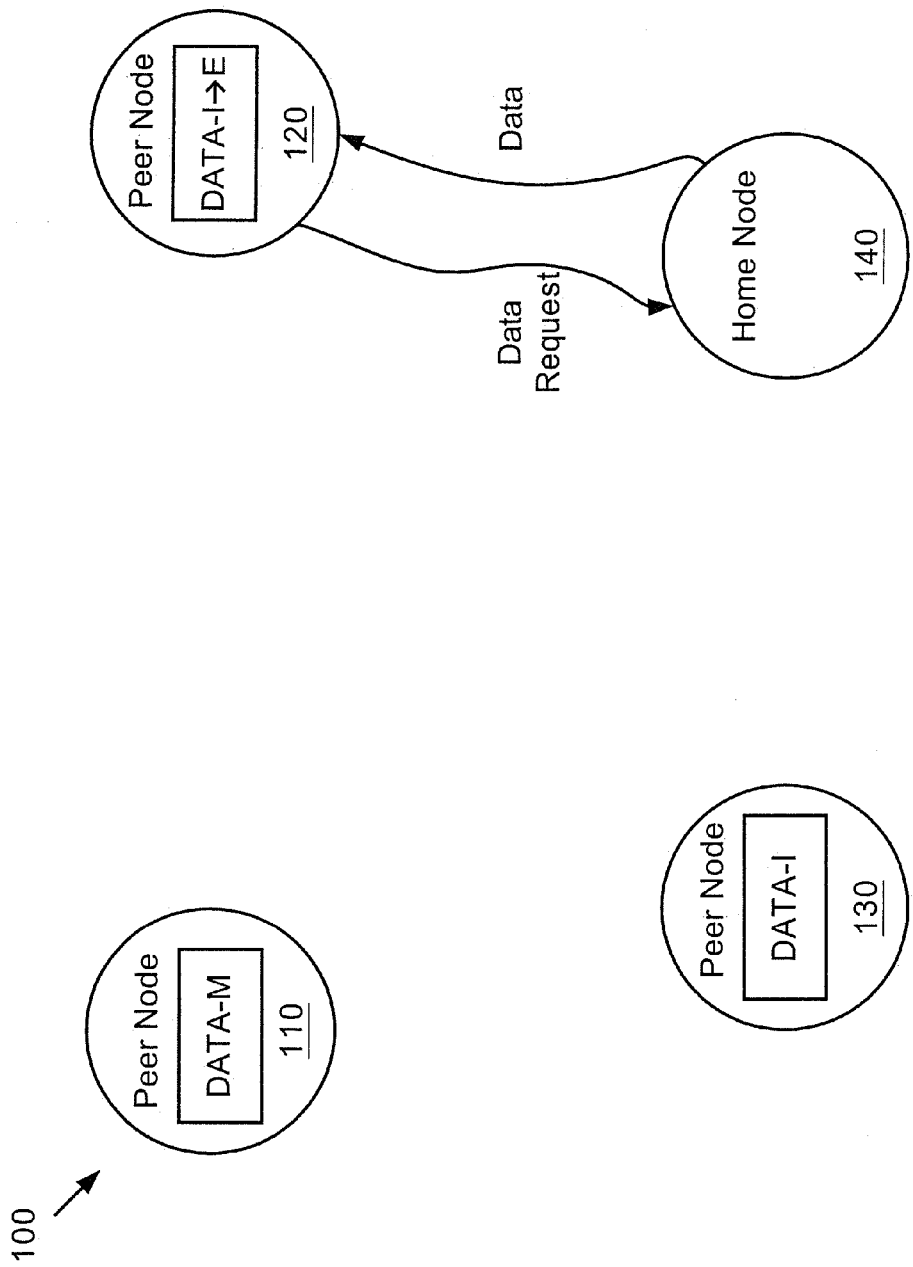
Figure 1E:
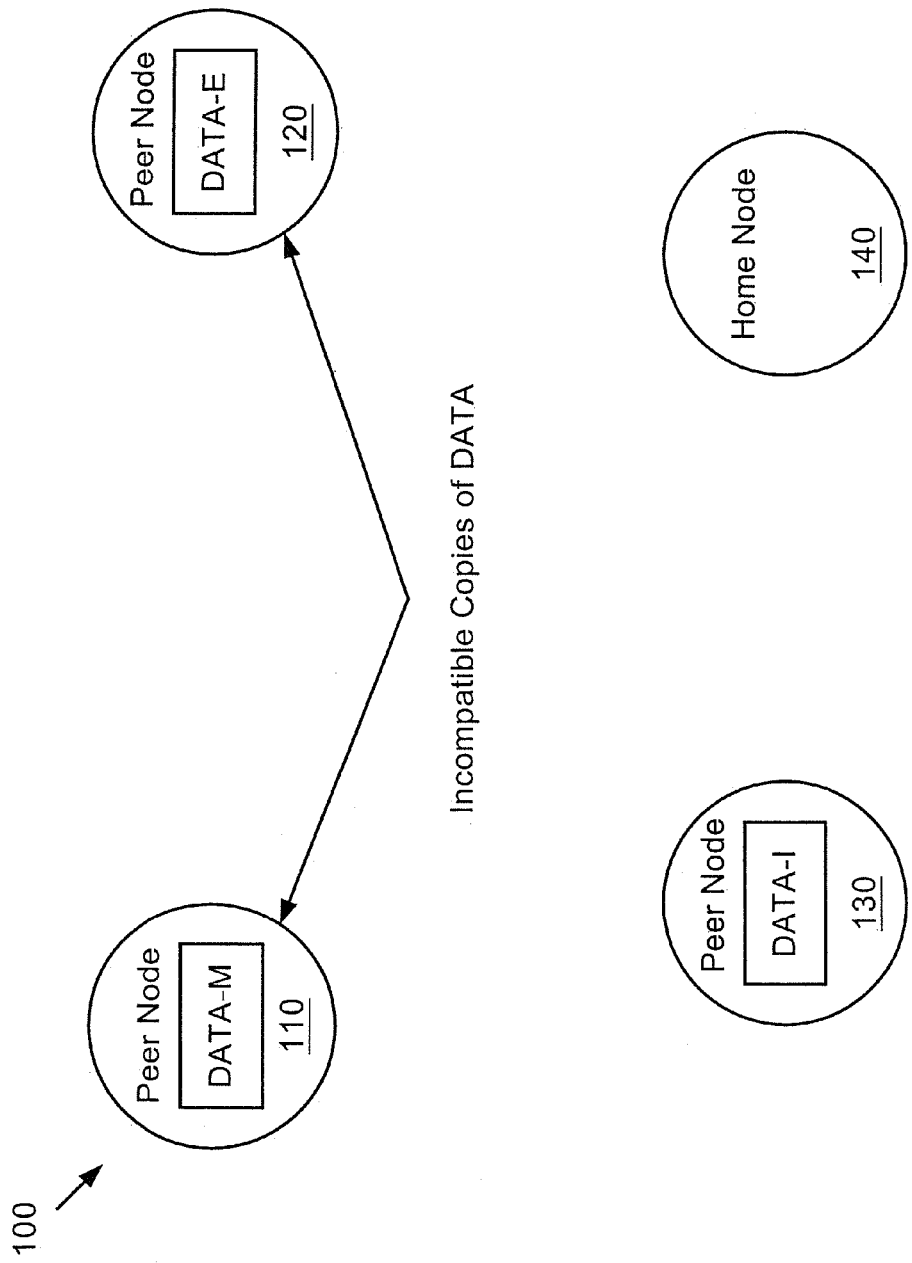

Techniques for distributed cache coherency conflict resolution in a multi-node system are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Request Messages

The following messages are requests for data/action from a requesting node. These messages are broadcast to all nodes of the system.

Port Read Line (PRL): This is a request for a copy of a data segment such as, for example, a cache line.

Port Read Invalidate Line (PRIL): This is a request for a copy of a data segment where the provider node's copy of the data is invalidated. This message can also be referred to as a "request for ownership."

Port Write Line (PWL): This message causes data (e.g., a modified cache line) to be written to memory. This message can also referred to as a "dirty eviction."

Port Invalidate Line (PIL): This message causes the state of designated data to change from Shared to Exclusive.

Port Write Invalidate Line (PWIL): This message causes data to be written to memory and the target copy of the data to be invalidated.

Response Messages

The following messages are messages from sent from Peer (i.e., Non-Home) nodes to the Requesting node in response to requests described above.

Invalid State Acknowledgement (IACK): This message is a response to a request (PRL, PRIL, PWL, PIL, PWIL) when the node sending the response has an invalid copy of the requested data or no copy of the requested data.

Shared State Acknowledgement (SACK): This message is a response to a request when the node sending the response has a copy of the requested data in the Shared state.

Acknowledgement of Data Received (DACK): This message is sent by a requesting node to the node from which the requesting node received data. It is sent after the requesting node has sent a READ or CNCL message to the home node and received a XFR/XFRI message or ACK message from the home node.

Conflict: This message indicates that there is a copending request for the requested cache line.

Messages to Home Node

These messages are transmitted to the Home node by a Peer node.

Read(Conflicts): This message requests data from the Home nodes and lists conflicts, if any. This message is sent after all responses are received by a peer node if none of the received messages were a DATA message.

CNCL(Conflicts): This message is sent to the Home node in response to a hit in a Peer node and lists conflicts, if any. This message cancels the Home node's prefetch operation. This message is sent after all responses are received by a peer node and one of them was a DATA message.

Data: This message is used to write back data for PWL and PWIL requests.

Messages From the Home Node

These messages are sent from the Home node to the Peer and/or Requesting nodes.

Data: This message includes the requested data and can indicate the state of the data (M/E/F/S) to be used by the Requesting node.

Transfer (XFR): This message causes the receiving node to transfer data to the node indicated in the message. The home node sends this message to the current owner of requested data when the home node is informed of a conflict condition requiring that the current owner of the data transfer the data to the target node. A XFRI message is sent instead of a XFR message if the home node determines that an unresolved conflicting request is a PRIL message, meaning that the current owner must invalidate the line when initiating the data transfer. In one embodiment, the first node in an epoch to send a CNCL message is the current owner. An epoch is the period between a first request for data and the resolution of all requests for the data. If the home node sends data to a node from memory, that node is the current owner. Sending a XFR/XFRI message causes the target node to become the current owner. In one embodiment, the target node is selected from a list of conflicts provided to the home node in a READ or a CNCL message.

Acknowledge (ACK): This message indicates that the requested data has been sent to the Requesting node. When the home node sends an ACK message, the current epoch is terminated.

Wait: This message causes the receiving node to pause before sending further messages.

Overview of the MESIF Protocol

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored. For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides. SCI, for example, uses this scheme, with each node that contains a cached copy maintaining links to other nodes with cached copies, thus collectively maintaining a complete directory.

Snooping schemes rely on broadcast, because there is no single place where the meta-information is held, so all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are inherently more scalable, but require more complex responses, often involving three nodes in point-to-point communications.

The basic MESIF protocol described herein provides a snooping protocol without the limitations of a single, serializing bus. Like a snooping cache protocol, MESIF relies on nodes with cached copies of data to maintain coherence. The use of point-to-point links rather than a synchronous, centralized broadcast introduces the problem of time-warp—the fact that events appear to occur in a different order from the viewpoint of different node. The MESIF protocol correctly handles time-warp, recognizing when potential errors could result and making sure that they are handled correctly. The notion of a Home node is primarily to determine where the uncached copy reside, but the Home node participates in every transaction—without being on the critical path—in order to resolve conflicts and time-warp issues. Because of the concurrent-broadcast nature of the scheme, MESIF achieves the low latency associated with snooping protocols, acquiring a cacheable copy of the data in most cases in the minimum possible latency: a single roundtrip request-response.

The basic MESIF protocol involves broadcasting an initial request to all peer nodes as well as the Home node. If a copy is cached in state E, F, or M, it is included in the response. A second message is then sent to the Home node, informing it that the request has been satisfied. If the requested line is uncached, or if only S-state copies exist, the second request sent to the Home node is used to confirm the previous request, which the Home node may have by now fetched from its memory. In either case, the Home node must respond to the second request (and to the first, though they can sometimes be combined) for purposes of synchronization and conflict resolution. Note that the Home node may have one or more caches, so it may respond to the initial request just like any other node.

Conflicts are handled in a distributed way. The timewarp problem makes it difficult to detect conflicts, because individual requests can be delayed for an arbitrarily long time. A conflict will be detected, however, if each node monitors for conflicts after making a request. Both nodes may or may not detect a conflict, but at least one will. Because all nodes must respond to a broadcast request either by supplying the data or indicating they do not have a copy (or, under some circumstances, are not supplying the copy they have), the response can include an indication of a conflict, so conflicting nodes will detect the conflict.

Complications arise from allowing a node to use the data as soon as the data arrives rather than waiting for all responses. Thus, a node receiving a copy of the data is allowed to use the data internally immediately upon receipt, but may not make the effects of using the data visible to the rest of the system until the node has received a confirmation from Home. The confirmation may also include instructions that the node must forward its copy to another node, and perhaps evict the node from its own cache.

Finally, when a node responds to a request from another node by supplying the cached data, the node must defer all other requests it receives for the same cache line until the node receives a response from the Home node acknowledging the fact that the node forwarded the data, thus assuring that all nodes observe the same order of transfer of the (possibly writable) cache line.

The Home node is the respository for the uncached data, but the home node also may have a processor generating requests and include one or more caches Like any other node, when the home nodes processor misses, the home node must broadcast requests to all other (peer) nodes, and the home node must handle the request internally as it would any other request arriving for the Home node. Note that this is a special case in that the home node does not explicitly send messages to itself (the Home node). In addition, when an external request arrives for data that is cached locally, the Home node must respond in a way to assure that a later response from the Home node is not ambiguous. That is, the home node may respond to the initial request by supplying the data, but the home node must also respond to the second request as the Home node.

A more detailed, pseudo-code-based description of various embodiments of the MESIF protocol suitable for use as described herein are attached hereto as Appendix A.

Overview of Speculative Distributed Conflict Resolution

In general, a cache coherency protocol requires conflict resolution in order to provide orderly changes of state for the various cache lines or other blocks of data. A conflict resolution technique described herein provides sequential consistency, which means that only a single, modifiable copy of a cache line can be present at any time, and that no copy of a cache line can be modified while other copies are readable. Conflicting requests to modify a copy of a cache line must, therefore, be resolved in order to maintain sequential consistency.

In one embodiment, a conflict is resolved using the property of time. That is, regardless of delays, two nodes cannot both request a cache line before the other. Thus, conflicts can be detected by at least one of the conflicting requestors if each node monitors all requests after that node has made its own request.

In one embodiment, if a line is in the Exclusive (E), Modified (M) or Forward (F) state, conflicts are resolved at the node holding the unique copy. The winner of the conflict resolution, and possibly the losers, report the conflict to the home node, which pairs conflict reports and issues forwarding instructions to assure that all requesting nodes eventually receive the requested data. In one embodiment, if a requested cache line is either uncached or present only in the Shared (S) state, the home node for the requested cache line provides a copy of the requested data and resolves conflicts.

In one embodiment, the distributed conflict resolution described herein is part of a cache protocol referred to as the MESIF protocol in which one of five states is associated with a cached copy of a cache line (Modified, Exclusive, Shared, Invalid, Forward). In one embodiment, a blackout period after all responses for a request until an acknowledgement message has been received from the home node allows all conflicting nodes to be aware of conflicts in which the nodes are involved. The blackout period does not limit use of the data in the cache, but does prevent the data from being propagated to other caches.

The discussion that follows is provided in terms of nodes within a multi-node system. In one embodiment, a node includes a processor having an internal cache memory, an external cache memory and/or an external memory. In an alternate embodiment, a node is an electronic system (e.g., computer system, mobile device) interconnected with other electronic systems. Other types of node configurations can also be used. In the examples that follow, dashed lines represent messages previously sent and solid lines represent messages being described. In order to keep the figures more clear, when a set of messages (e.g., PRIL and corresponding IACK) are resolved, the lines representing the messages are no longer included in the figures.

FIGS. 2a through 2d provide a conceptual illustration of a shared line conflict. In the example of FIGS. 2a through 2d, peer nodes 210 and 220 both request a copy of a block of data (e.g., a cache line). Peer node 230 stores the available copy of the requested block of data in the M state. The processing described also applies if peer node 230 stores the requested data in the S state or the F state.

The numbering associated with the various messages of FIGS. 2a through 2d (e.g., 1. PRIL, 7. IACK) provide approximate ordering for purposes of providing an example of a conflict. The exact timing relationships illustrated in FIGS. 2a through 2d, as well as the other examples provided (i.e., FIGS. 3a-3d, 4a-4d, 5a-5d, 6a-6d), are not required.

Figure 2A:
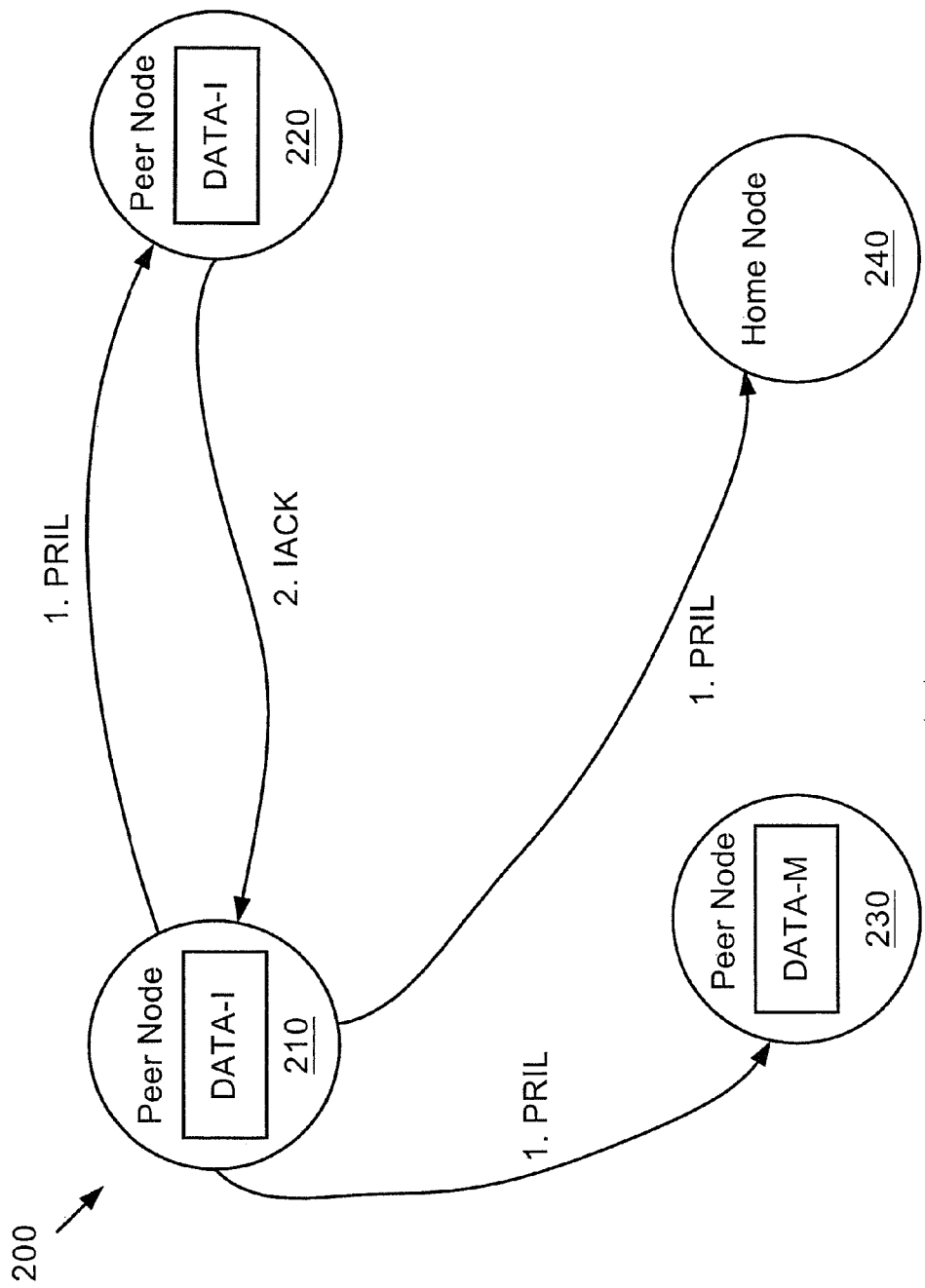
FIGS. 2a through 2d provide a conceptual illustration of a shared line conflict.

As illustrated in FIG. 2a, peer node 210 requests a block of data by transmitting a PRIL message to peer nodes 220 and 230 and to home node 240. Peer node 210 could also request the same block of data using a PRL message, in which case peer node 230 would not invalidate its copy in response to the request message. Peer node 220 responds to the PRIL message with an IACK message indicating that peer node 220 does not store a valid copy of the requested block of data.

Home node 240 serves as the home node for the data to be requested, which means that node 240 is associated with non-cache memory (e.g., main memory) in which the data to be requested is stored when not cached. For example, home node 240 can be a processor, cache memory and random access memory (RAM), where the RAM provides a non-cached storage location for the data.

Figure 2B:
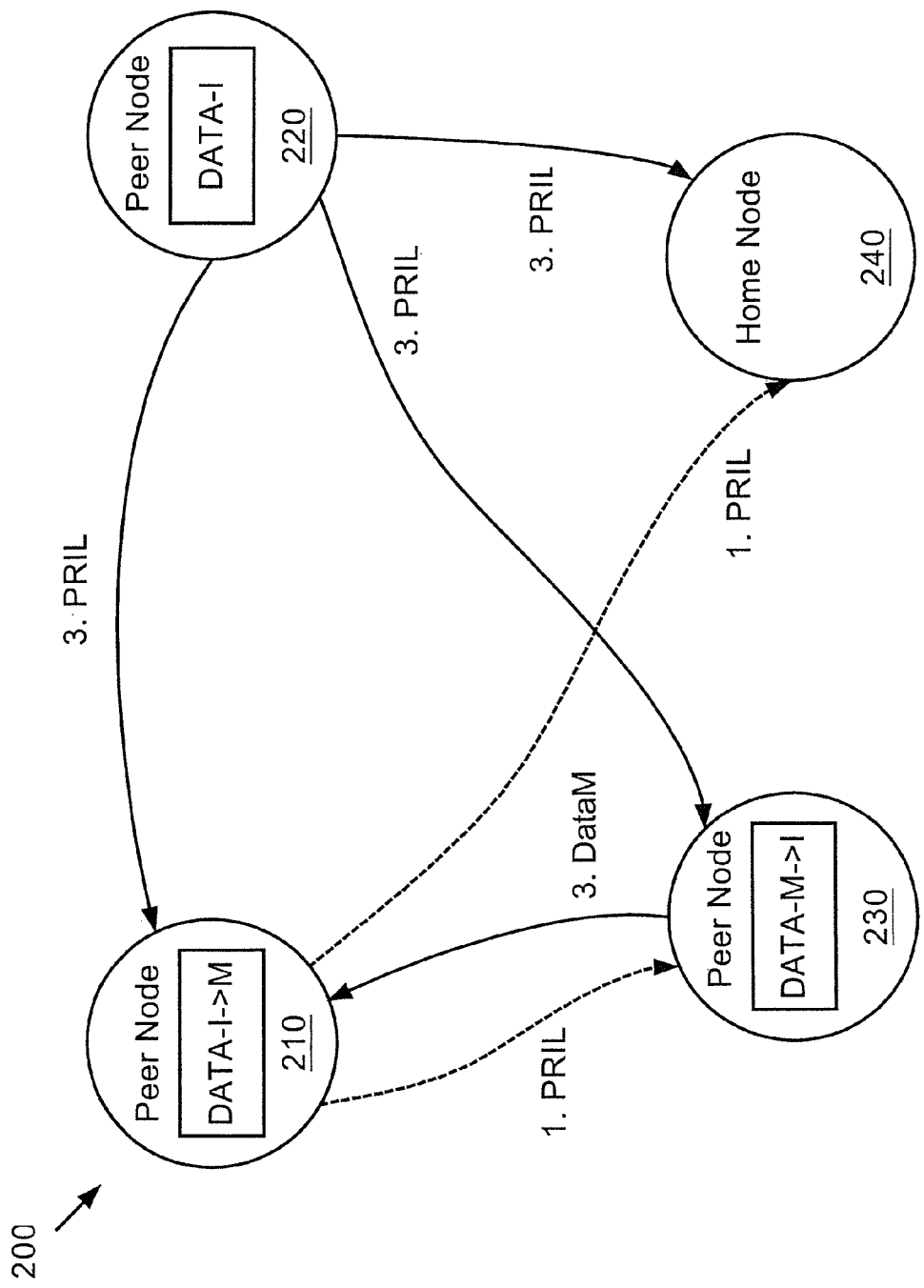

FIG. 2b illustrates peer node 220 transmitting a PRIL message to peer nodes 210 and 230 and to home node 240 requesting the block of data previously requested by peer node 210. As noted above, the data can also be requested using a PRL message. While the conflict of FIGS. 2a through 2d is illustrated with PRIL messages, any combination of requesting messages in which an inconsistent result can occur causes a conflict.

At approximately the same time as peer node 220 transmits the PRIL messages, peer node 230 responds to the PRIL message from peer node 210 by transmitting a DataM message to peer node 210. The DataM message provides a copy of the requested data to peer node 210 and causes peer node 210 to store the data in the Modified (M) state. Other states can be specified, for example, the Forward (F) state. The state of the copy of the requested data stored by peer node 230 is changed from the M state to the Invalid (I) state.

Figure 2C:
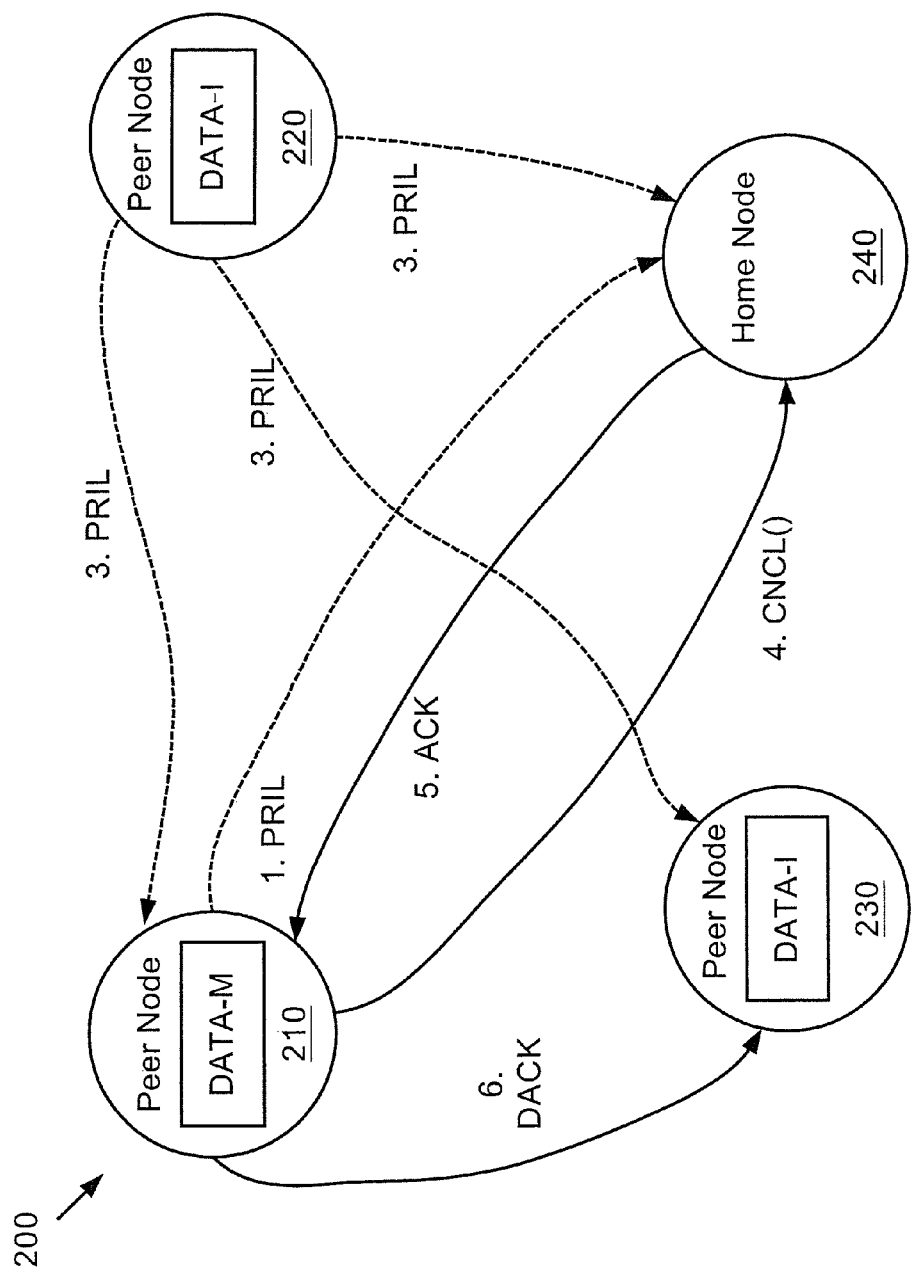

As illustrated in FIG. 2c, in response to receiving the DataM message from peer node 230, peer node 210 sends a CNCL( ) message to home node 240. The CNCL( ) message cancels the retrieval of the requested block of data from memory, if the retrieval has started. Home node 240 responds with an ACK message to peer node 210 that acknowledges receipt of the CNCL( ) message, which indicates the completion of processing of the PRIL message from peer node 210.

In response to receiving the ACK message from home node 240, peer node 210 transmits a DACK message to peer node 230 acknowledging receipt of the requested data from peer node 230. The period between receipt of the data from peer node 230 and transmission of the DACK message to peer node 230 is a blackout period during which the block of data is not transmitted to another node. During the blackout period peer node 210 does not respond to the PRIL message from peer node 220. Similarly, peer node 230 does not respond to the PRIL message from peer node 220 during the blackout period.

Figure 2D:
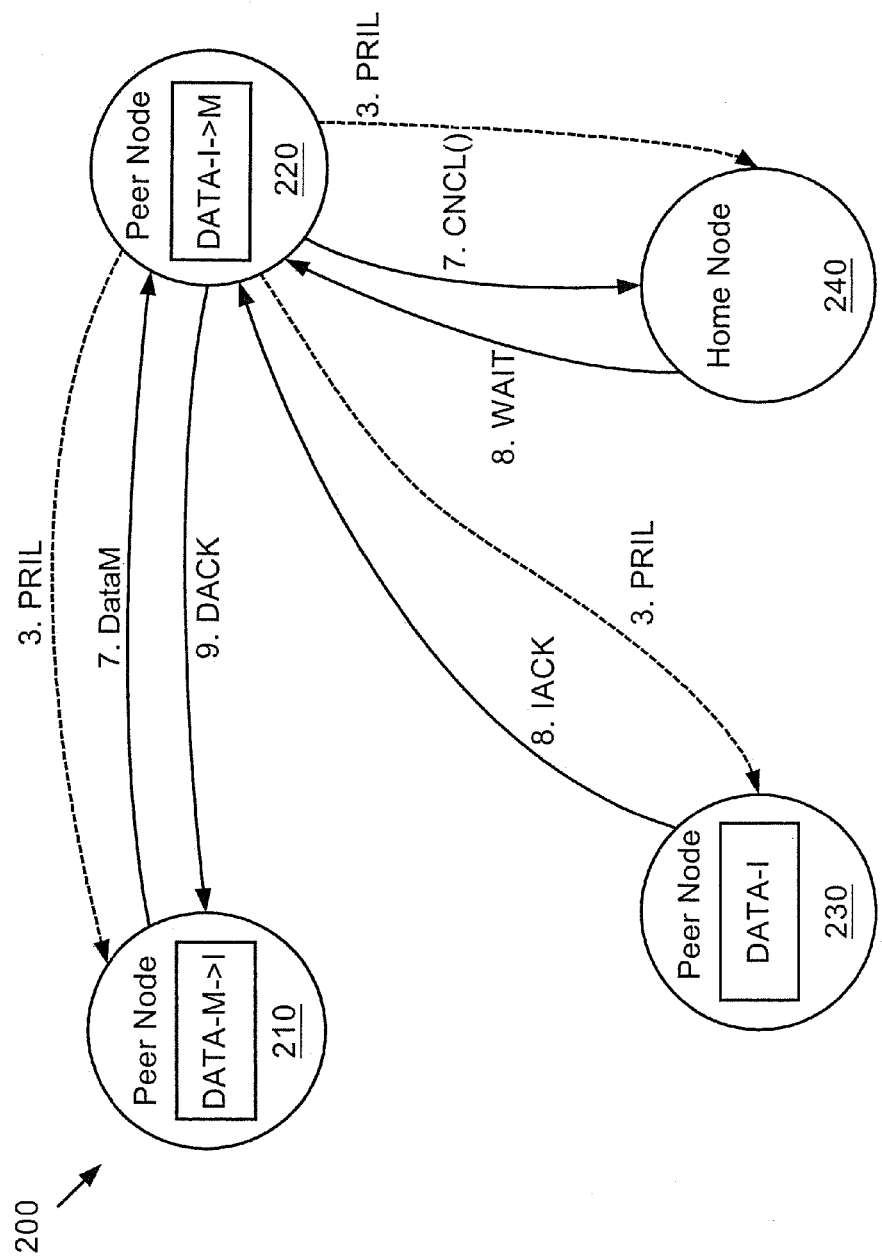

As illustrated in FIG. 2d, peer node 210 transmits a DataM message to peer node 220 to provide a copy of the requested data to peer node 220 and to cause peer node 220 to store the copy of the data in the M state. Other types of messages (e.g., DataF, DataS) can be used to provide the requested data to peer node 220. Peer node 210 also marks the copy of the data retained, if any, as being in the I state because the DataM message is in response to a PRIL message. The copy of the requested data retained would not be invalidated by, for example, a PRL message. Peer node 220 also sends a CNCL( ) message to home node 240 to cancel any retrieval of the requested data from non-cache memory. Home node 240 responds with a WAIT message that causes peer node 220 to pause before sending further messages.

At some time during the process described, peer node 230 and agent 290 send an IACK message to peer node 220 in response to the PRIL message requesting the block of data that is now either not stored by peer node 230 or stored in the I state. Peer node 220 responds to the DataM message from peer node 210 by transmitting a DACK message to peer node 210. The DACK message concludes the resolution of the conflicting PRIL messages from peer nodes 210 and 220.

Figure 3A:
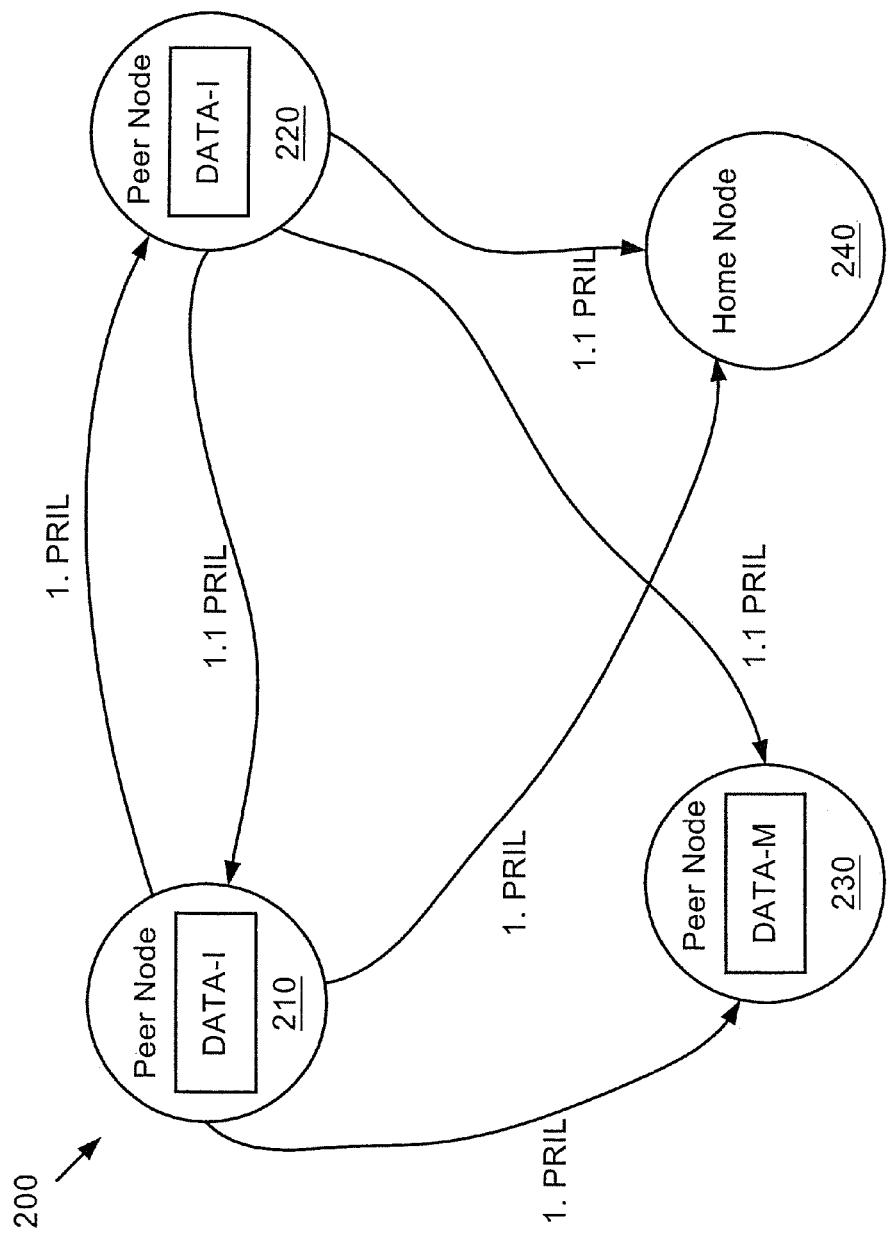
FIGS. 3a through 3d provide a conceptual illustration of a shared line conflict caused by requests issuing at approximately the same time.

FIGS. 3a through 3d provide a conceptual illustration of a shared line conflict caused by requests issuing at approximately the same time (a tie condition). As illustrated in FIG. 3a, Peer node 210 transmits PRIL messages requesting a block of data to peer nodes 220 and 230 and to home node 240. Some short period of time later, or even at the same time, peer node 220 sends PRIL messages to peer nodes 210 and 230 and to home nodes 240 requesting the same block of data.

Figure 3B:
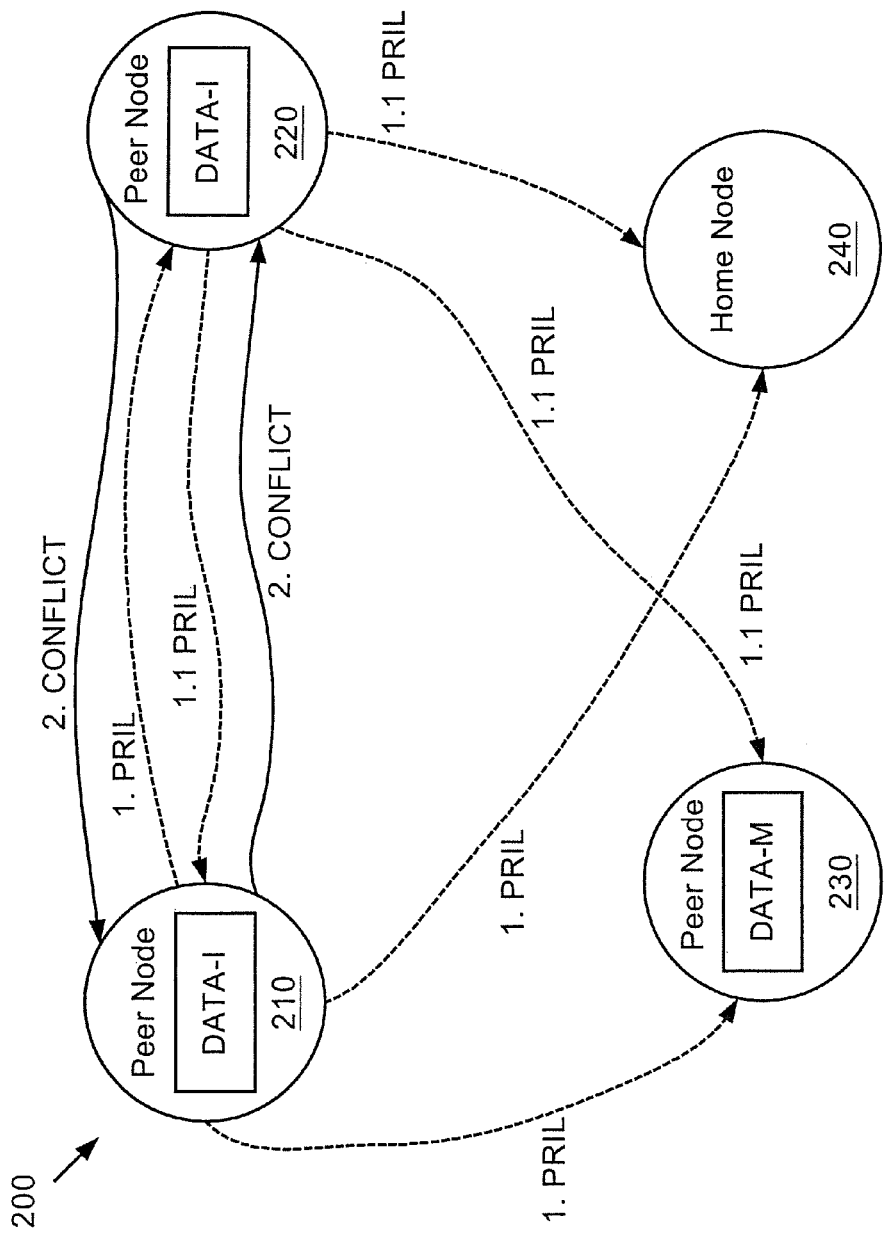

In response to receiving a PRIL message from another peer node before receiving the requested data, peer node 210 sends a CONFLICT message to peer node 220, which is the source of the conflicting PRIL message. The CONFLICT message communicates the existence of a request conflict from a peer node identifying the conflict to one or more other peer nodes involved in the conflict. Similarly, peer node 220 sends a CONFLICT message to peer node 210 in response to receiving a PRIL message before receiving the requested data. FIG. 3b illustrates the transmission of the CONFLICT messages between peer nodes 210 and 220.

Figure 3C:
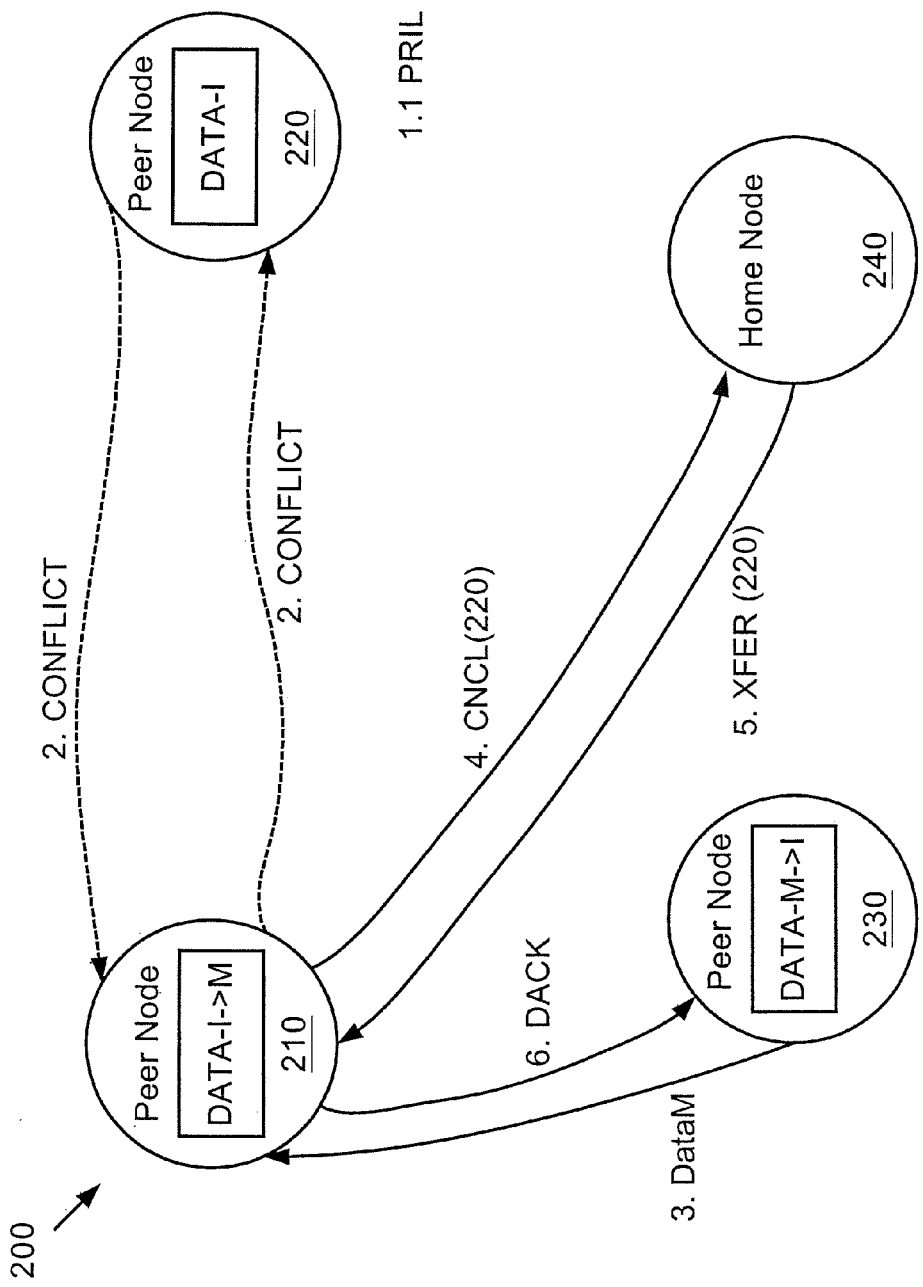

As illustrated in FIG. 3c, peer node 230 provides the requested data to peer node 210 in a DataM message and marks the copy of the data retained, if any, to the I state. Peer node 210 receives the requested data and stores it in the M state. Peer node 210 then sends a CNCL(220) message to home node 240. The CNCL(220) message causes home node 240 to cancel retrieval of the requested data from memory and indicates to home node 240 that a conflict exists between the sending node (i.e., peer node 210) and peer node 220.

In response to the CNCL(220) message, home node 240 sends a XFER(220) message to peer node 210. The XFER (220) message causes peer node 210 to forward a copy of the data to peer node 220. In one embodiment, peer node 210 uses and/or modifies the requested block of data before sending a copy of the data to peer node 220. In an alternate embodiment, peer node 210 sends a copy of the data to peer node 220 immediately. In response to receiving the XFER(220) message from home node 240, peer node 210 sends a DACK message to peer node 230 acknowledging receipt of the requested data.

Figure 3D:
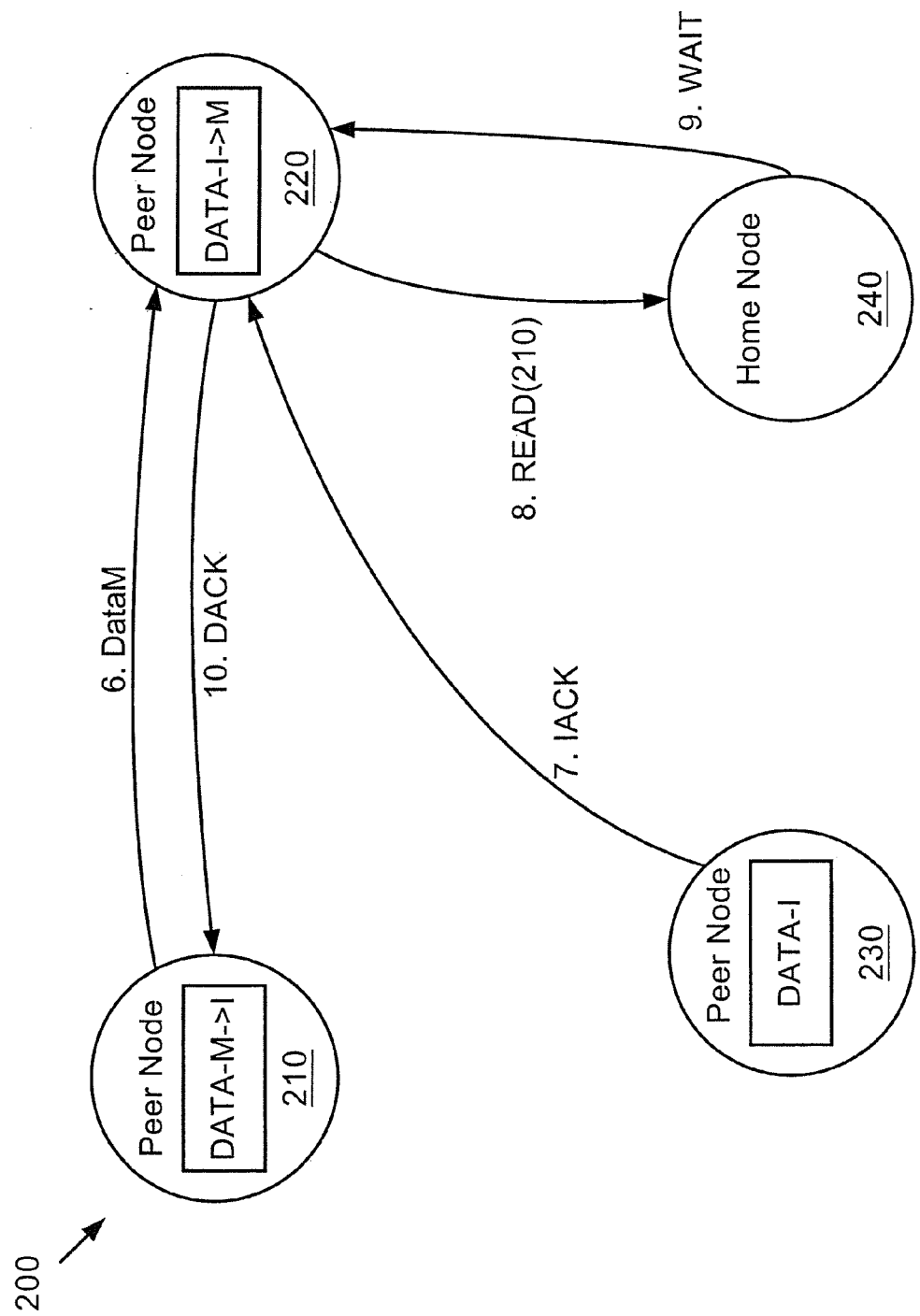

As illustrated in FIG. 3d, in response to receiving the DACK message from peer node 210, peer node 230 sends an IACK message to peer node 220 indicating that peer node 230 does not store a valid copy of the requested data. Peer node 230 does not respond to the second PRIL message (i.e., the PRIL message from peer node 220) until the first PRIL message (i.e., the PRIL message from peer node 210) is resolved. In response to the XFER(220) message from home node 240, peer node 210 sends a copy of the requested data to peer node 220 in a DataM message. Peer node 210 marks any copy of the data retained in the I state and peer node 220 stores the copy of the data received in the M state.

Peer node 220 sends a READ(210) message to home node 240 to halt retrieval of the requested data from memory and to indicate the peer node 220 has detected a conflict with peer node 210. Home node 240 responds to the READ(210) message with a WAIT message that is transmitted to peer node 220. The WAIT message causes peer node 220 to pause a predetermined period of time before transmitting any subsequent messages. Peer node 220 sends a DACK message to peer node 210 to indicate receipt of the requested data.

Figure 4A:
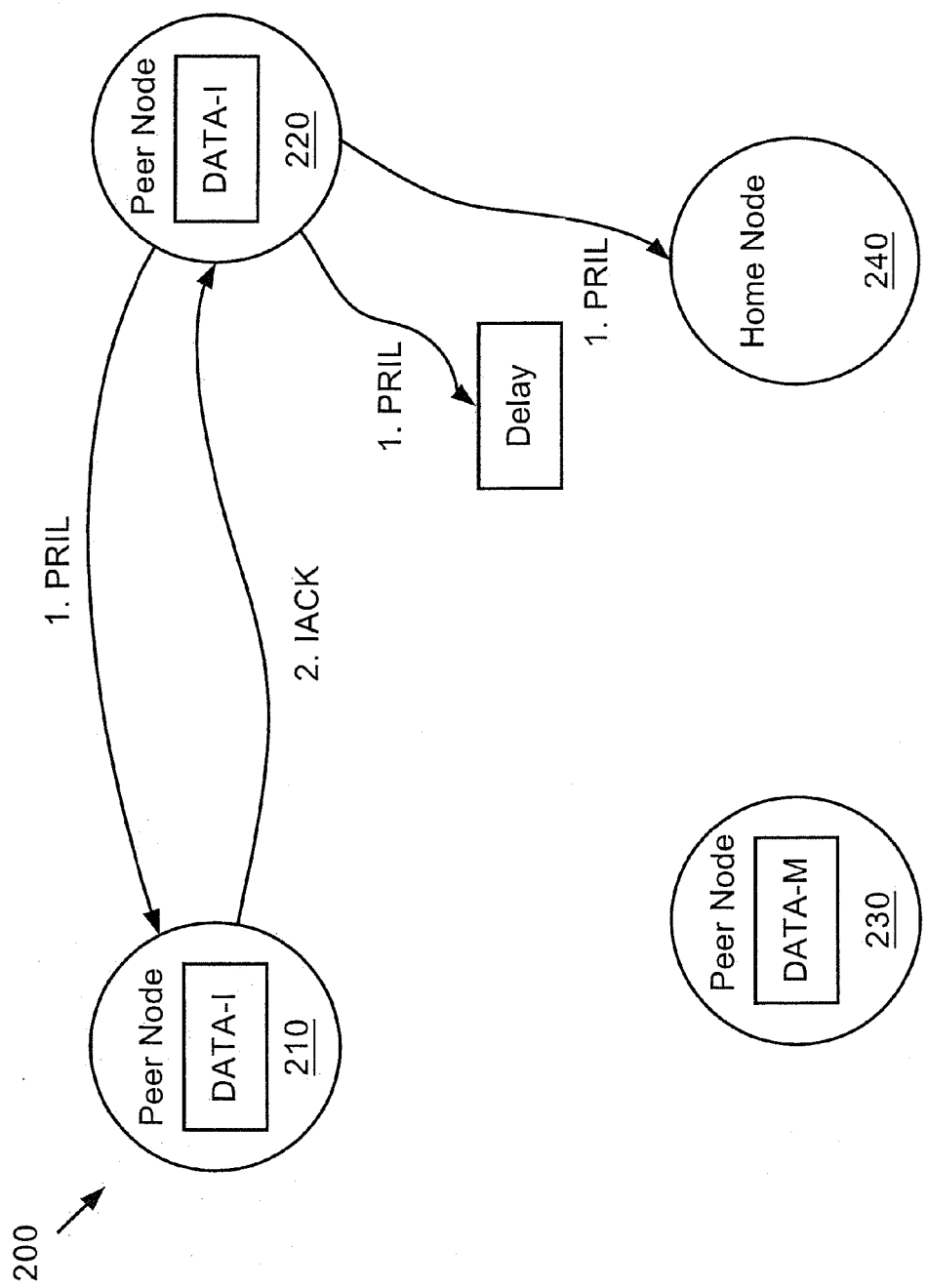
FIGS. 4a through 4d provide a conceptual illustration of a shared line conflict caused by a delay of one of multiple requests.

FIGS. 4a through 4d provide a conceptual illustration of a shared line conflict caused by a delay of one of multiple requests. As illustrated in FIG. 4a, peer node 220 transmits a PRIL message to peer nodes 210 and 230 and to home node 240 requesting a block of data. The PRIL message intended for peer node 230 is delayed. The delay can be the result of, for example, system latency, packet corruption, or any other reason. Peer node 210 responds to the PRIL message with an IACK message indicating that peer node 210 does not store a valid copy of the requested data.

Figure 4B:
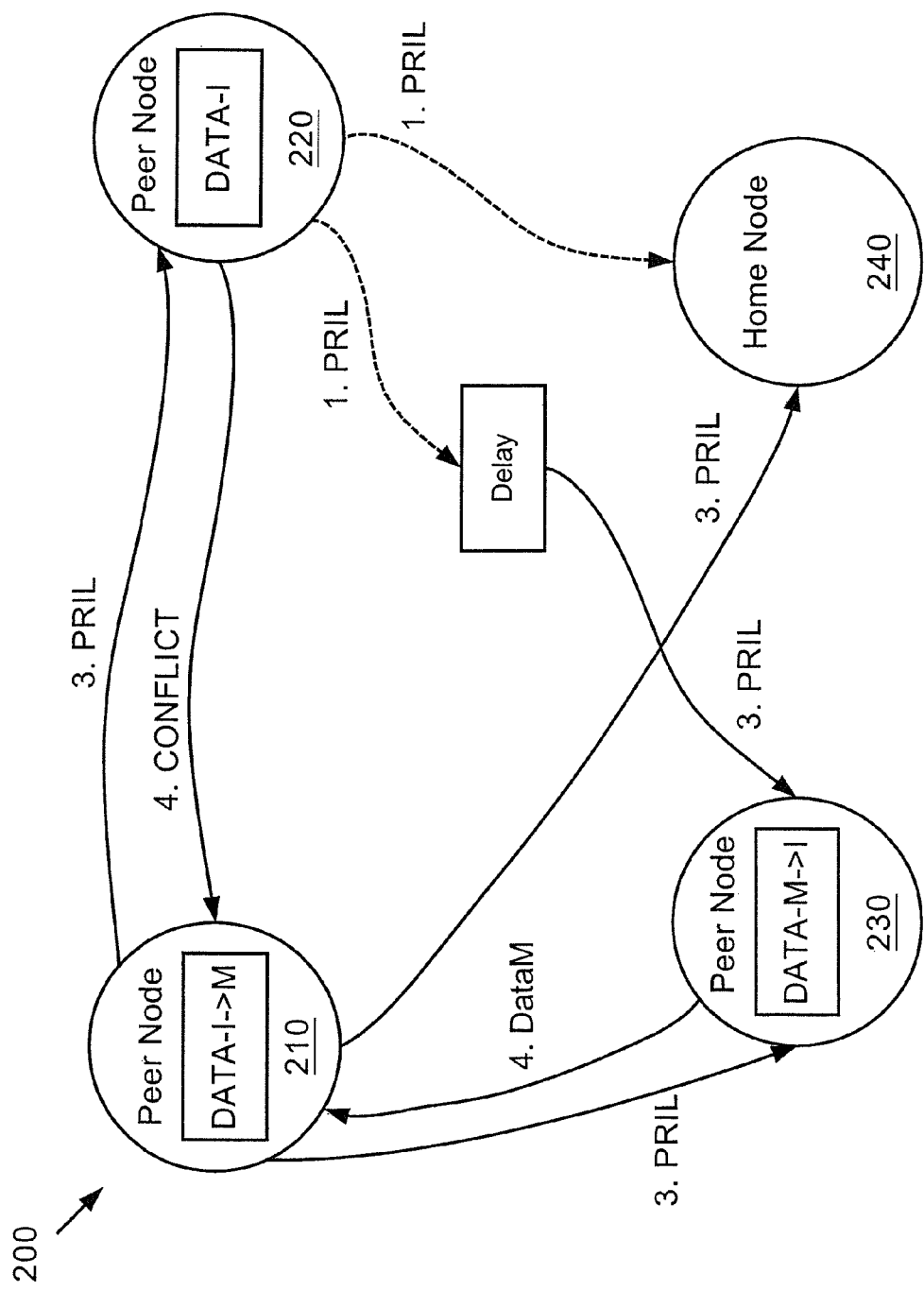

As illustrated in FIG. 4b, peer node 210 transmits a PRIL message to peer nodes 220 and 230 and to home node 240 requesting the same block of data. The delayed PRIL message from peer node 220 is received by peer node 230 at the same time or after the PRIL message from peer node 210. Peer node 230 responds to the PRIL message from peer node 210 with a DataM message that provides a copy of the requested data to peer node 210 and causes peer node 210 to store the data in the M state. Peer node 230 marks a retained copy, if any, of the requested data in the I state. Peer node 220 responds to the PRIL message from peer node 210 with a CONFLICT message indicating to peer node 210 that peer node 220 has detected a conflict between requests by the two nodes.

Figure 4C:
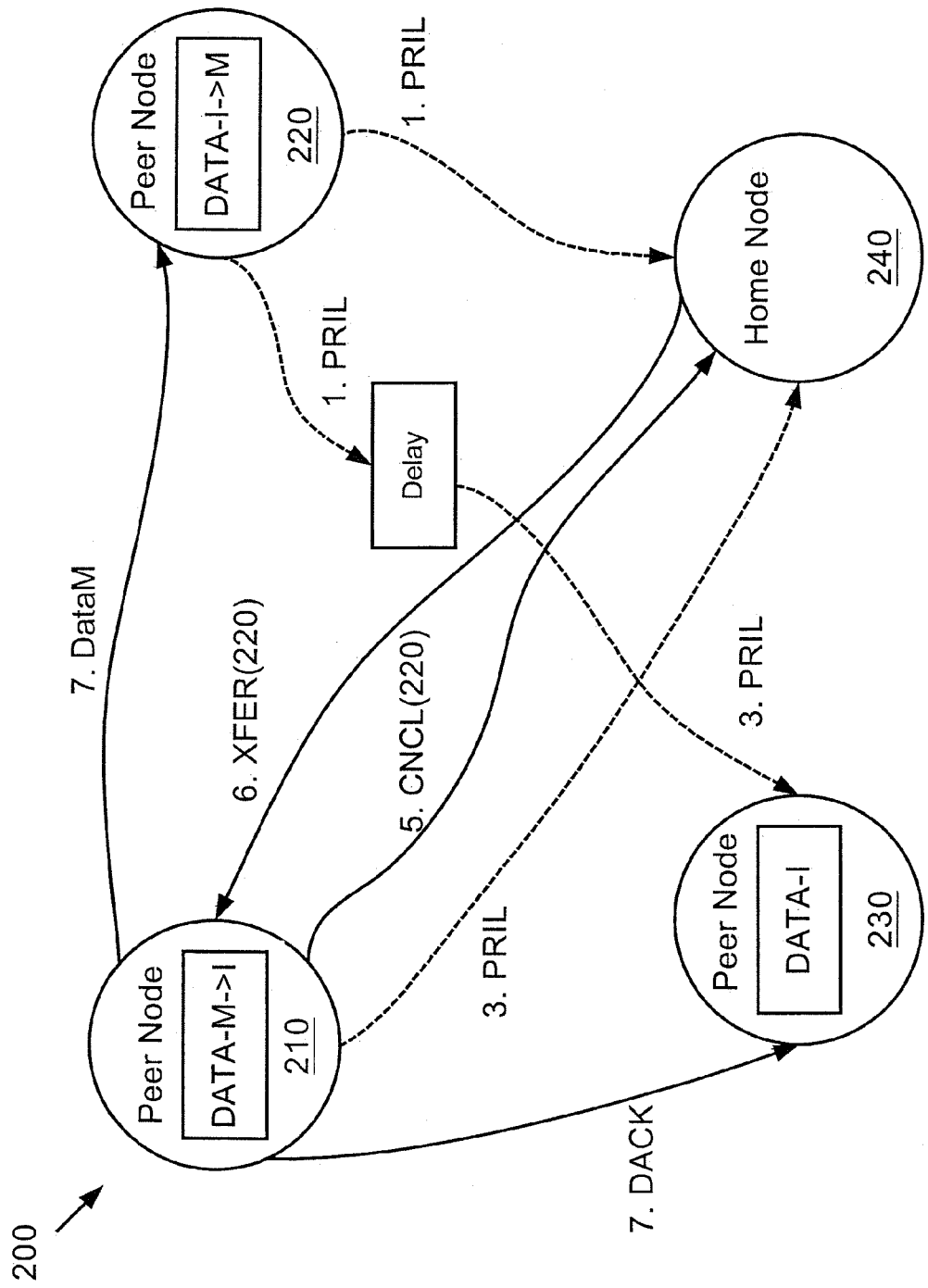

As illustrated in FIG. 4c, peer node 210 sends a CNCL(220) message to home node 240 to cancel retrieval of the requested data from memory. The CNCL(220) message also indicates to home node 240 that a conflict exists between peer node 210 and peer node 220. Home node 240 responds to the CNCL(220) message with a XFER(220) message that causes peer node 210 to send a copy of the requested data to peer node 220. In one embodiment, peer node 210 uses and/or modifies the requested block of data before sending a copy of the data to peer node 220. In an alternate embodiment, peer node 210 sends a copy of the data to peer node 220 immediately.

Peer node 210 transmits a DACK message to peer node 230 to acknowledge receipt of the requested data. Peer node 210 also sends a DataM message to peer node 220 to provide a copy of the requested data. Peer node 220 stores the requested data in the M state while peer node 210 marks any remaining copy of the requested data in the I state.

Figure 4D:
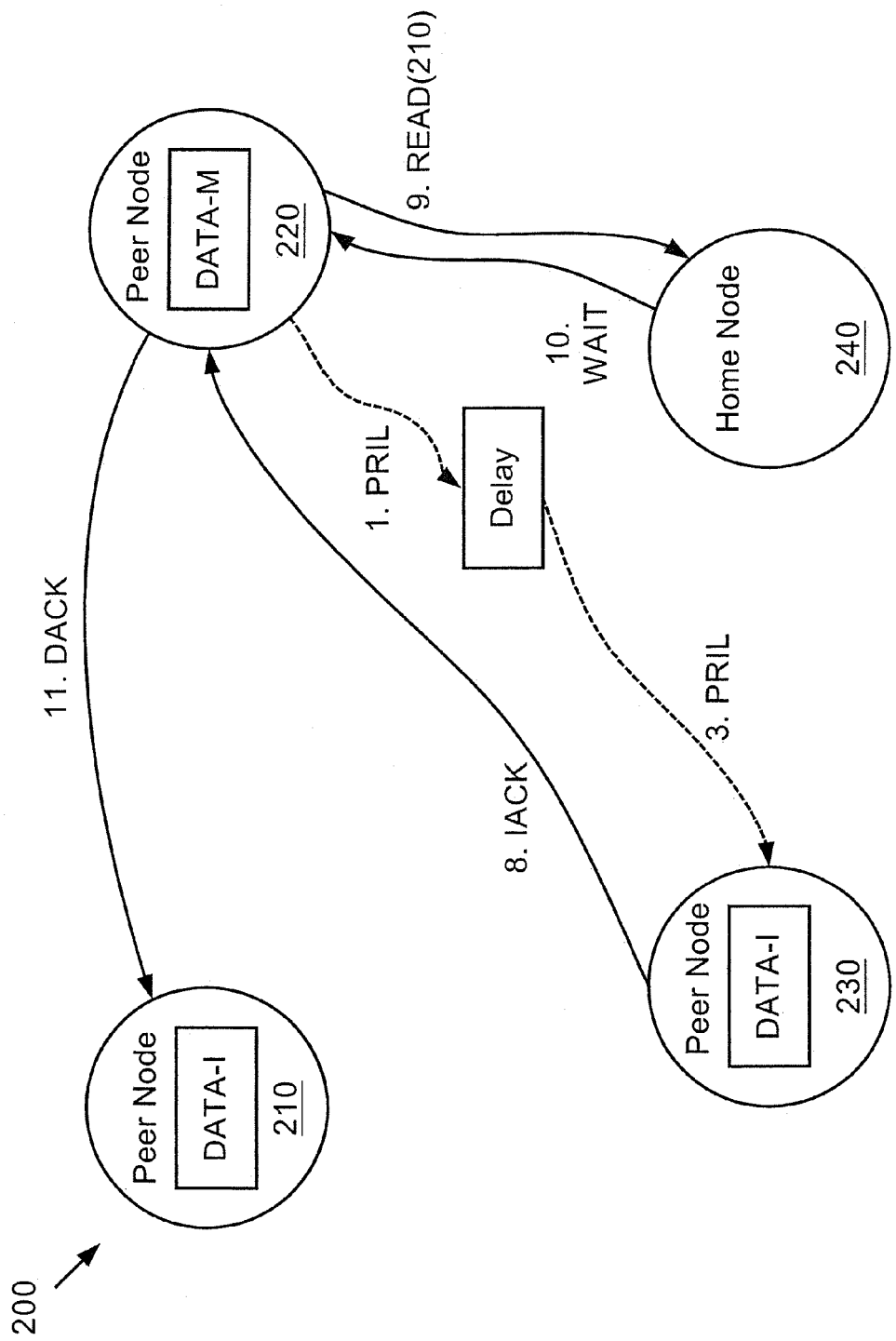

As illustrated in FIG. 4d, peer node 230 sends an IACK message to peer node 220 in response to receiving the DACK message from peer node 210. The IACK message indicates that peer node 230 does not store a valid copy of the requested data. Peer node 220 sends a READ(210) message to home node 240. The READ(210) message cancels retrieval of the requested data from memory and indicates to home node 240 that peer node 220 has a conflict with peer node 210.

Home node 240 responds to the READ(210) message with a WAIT message that causes peer node 220 to pause a predetermined period of time before sending any subsequent messages. Peer node 220 responds to the DataM message from peer node 210 with a DACK message, which acknowledges receipt of the requested data from peer node 210.

Figure 5A:
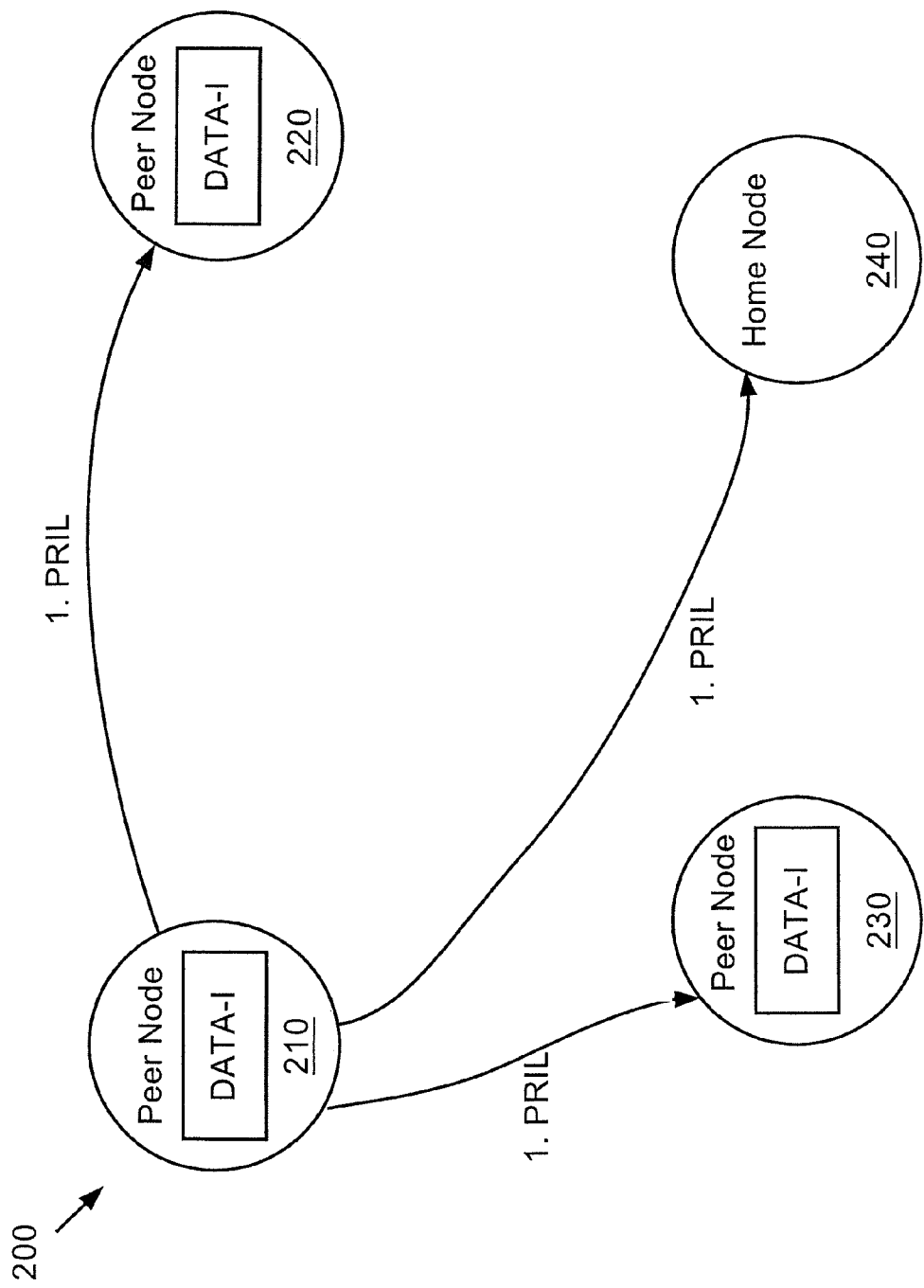
FIGS. 5a through 5d provide a conceptual illustration of an invalid line conflict.
Figure 5B:
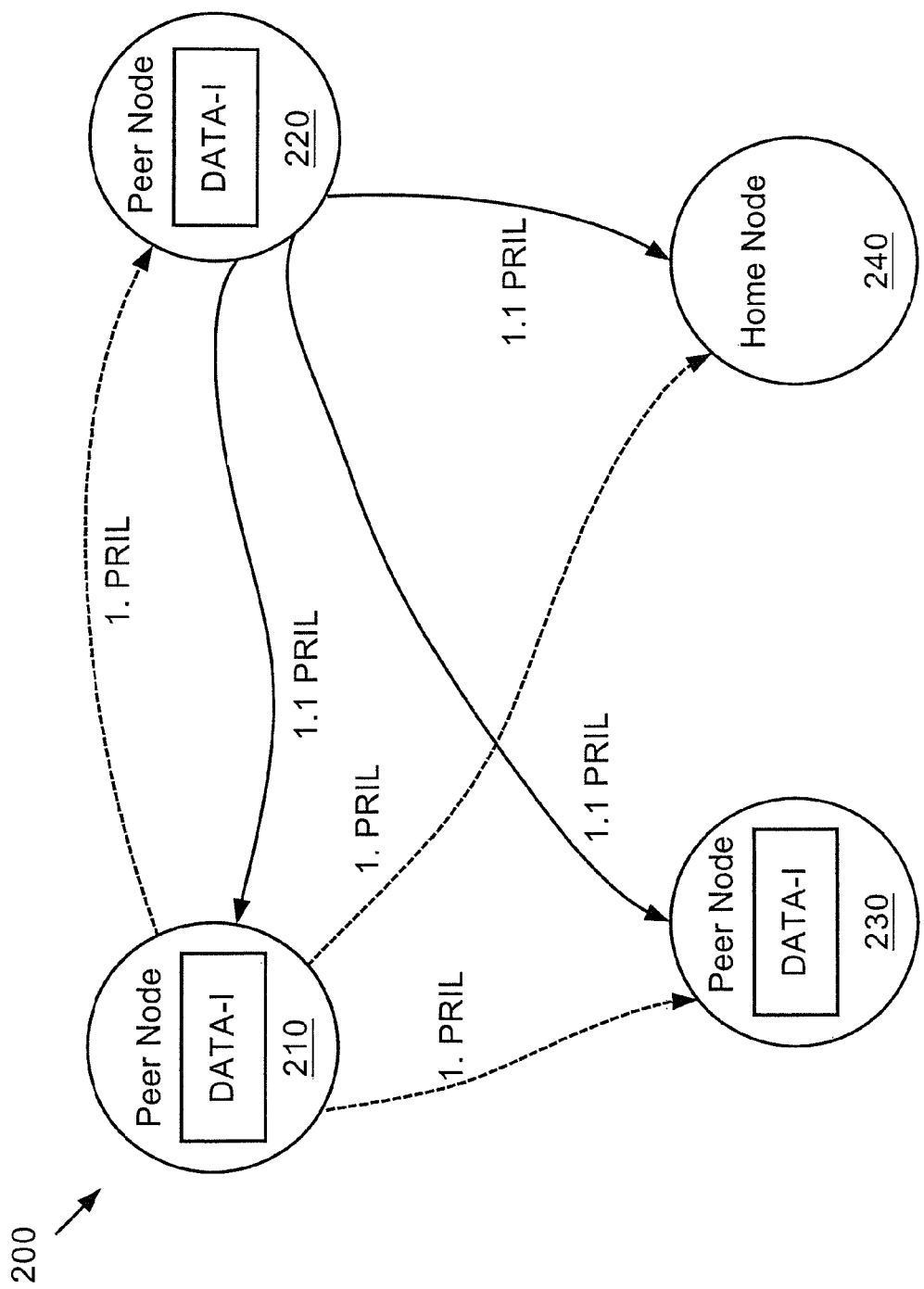

FIGS. 5a through 5d provide a conceptual illustration of an invalid line conflict. As illustrated in FIG. 5a, peer node 210 transmits a PRIL message to request a block of data to peer nodes 220 and 230 and to home node 240. As illustrated in FIG. 5b, at the same time, or soon after the PRIL message from peer node 210, peer node 220 transmits a PRIL message requesting the same data to peer nodes 210 and 230 and to home node 240.

Figure 5C:
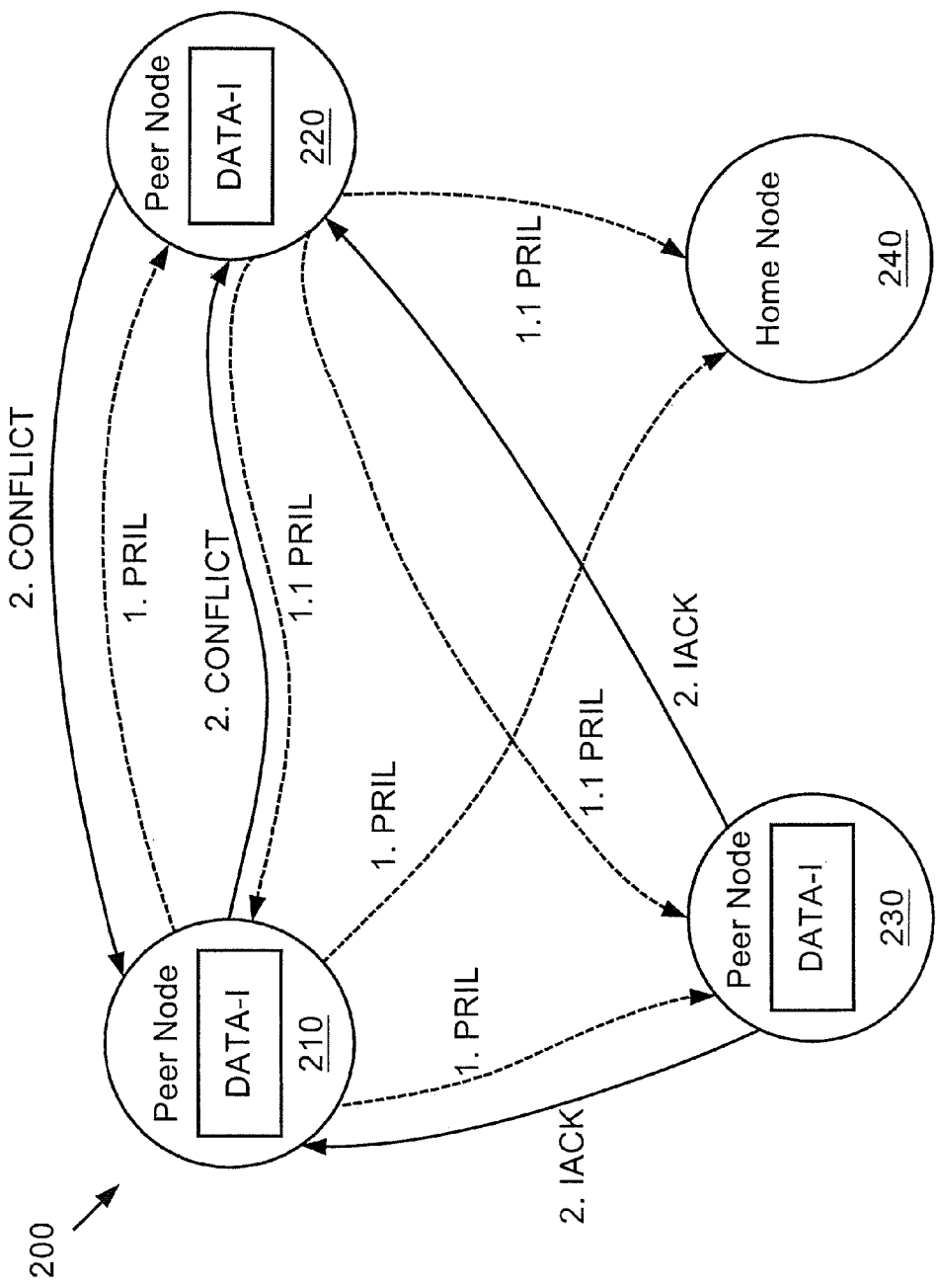

As illustrated in FIG. 5c, peer node 230 responds to the PRIL message from peer node 210 with an IACK message indicating that peer node 230 does not store a valid copy of the requested data. Similarly, peer node 230 responds to the PRIL message from peer node 220 with an IACK message. Peer node 220 responds to the PRIL message from peer node 210 with a CONFLICT message to communicate the identification of a conflict between peer nodes 210 and 220. Similarly, peer node 210 responds to the PRIL message from peer node 220 with a CONFLICT message.

Figure 5D:
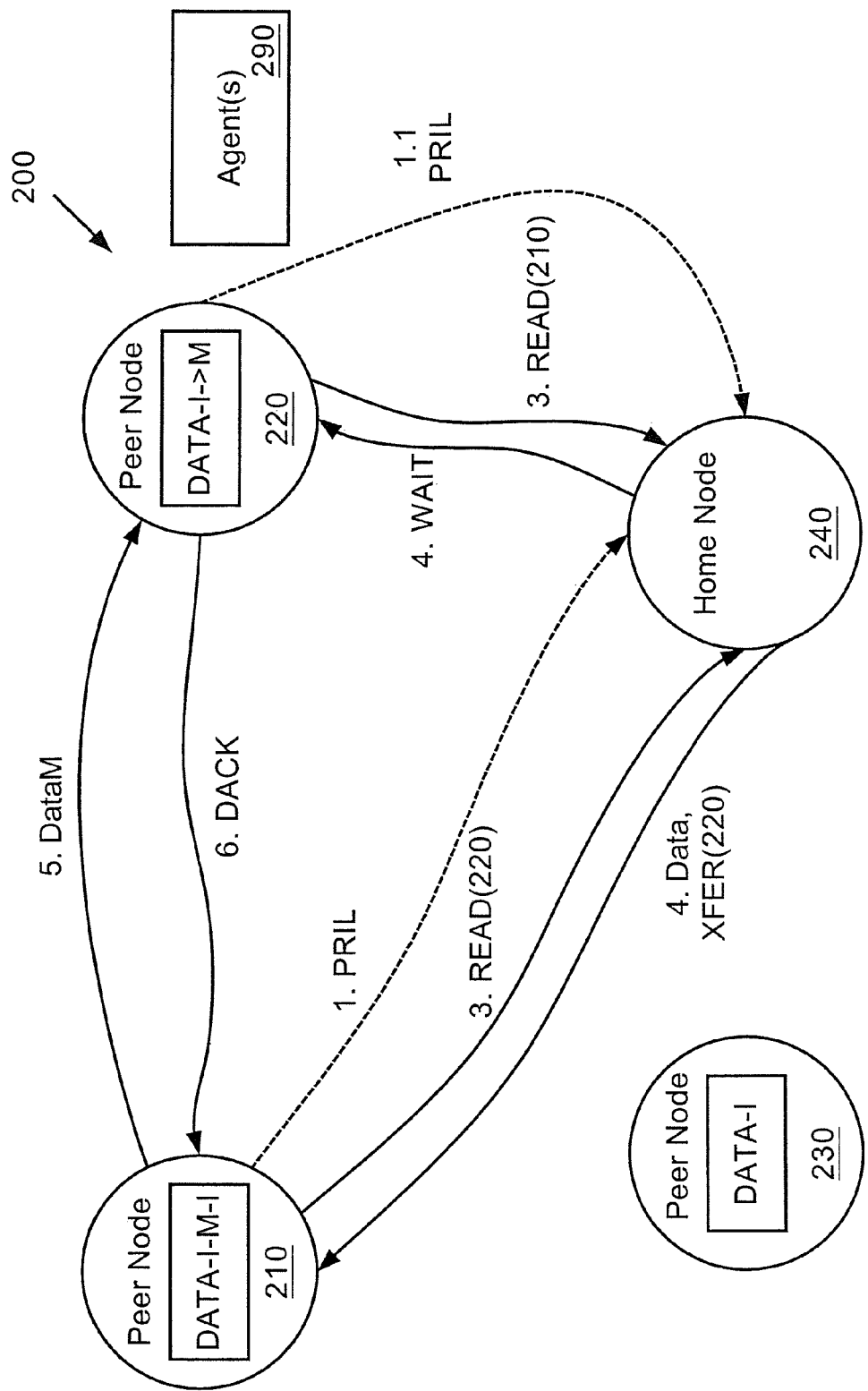

As illustrated in FIG. 5d, peer node 210 sends a READ(220) message to home node 240. The READ(220) message reads the previously requested data from home node 240, which has retrieved the requested data from memory. Home node 240 provides the requested data to peer node 210 with a Data,XFER(220) message. In one embodiment, home node 240 includes information from two types of messages (i.e., Data and XFER) into a single message packet. This "piggybacking" technique can reduce the bandwidth required to resolve conflicts.

The Data,XFER(220) message provides the requested data to peer node 210 and also causes peer node 210 to transfer the requested data to peer node 220. When peer node 210 receives the requested data, the requested data is stored in the M state.

After receiving the requested data, peer node 210 sends a copy of the requested data to peer node 220 with a DataM message. Any copy of the requested data retained by peer node 210 is marked in the I state. Peer node 220 stores the requested data in the M state and acknowledges receipt of the requested data with a DACK message to peer node 210.

Figure 6A:
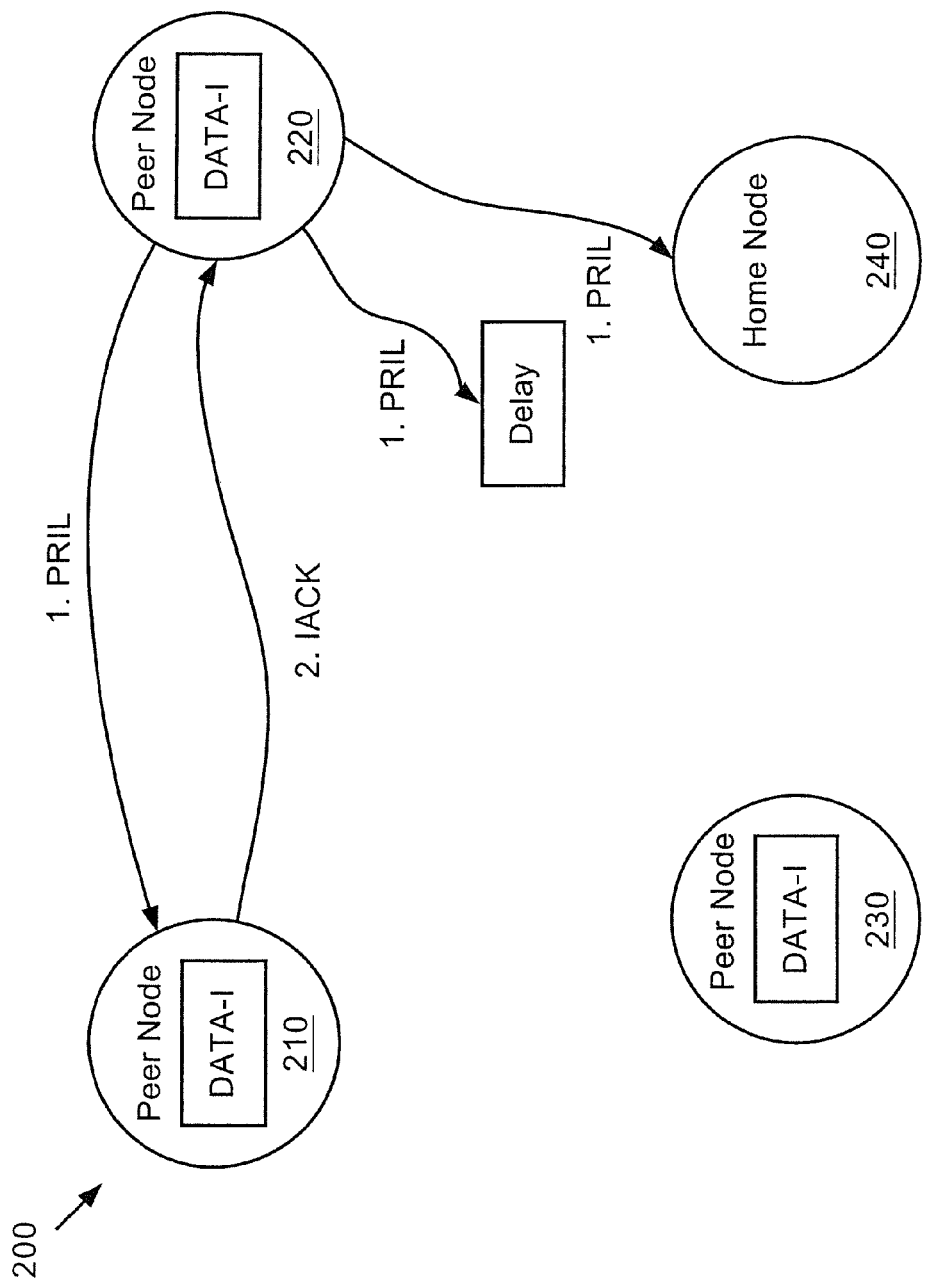
FIGS. 6a through 6d provide a conceptual illustration of an invalid line conflict caused by a delay of one of multiple requests.

FIGS. 6a through 6d provide a conceptual illustration of an invalid line conflict caused by a delay of one of multiple requests. As illustrated in FIG. 6a, peer node 220 transmits a PRIL message to peer nodes 210 and 230 and to home node 240 requesting a block of data. The PRIL message intended for peer node 230 is delayed. The delay can be the result of, for example, system latency, packet corruption, or any other reason. Peer node 210 responds to the PRIL message with an IACK message indicating that peer node 210 does not store a valid copy of the requested data.

Figure 6B:
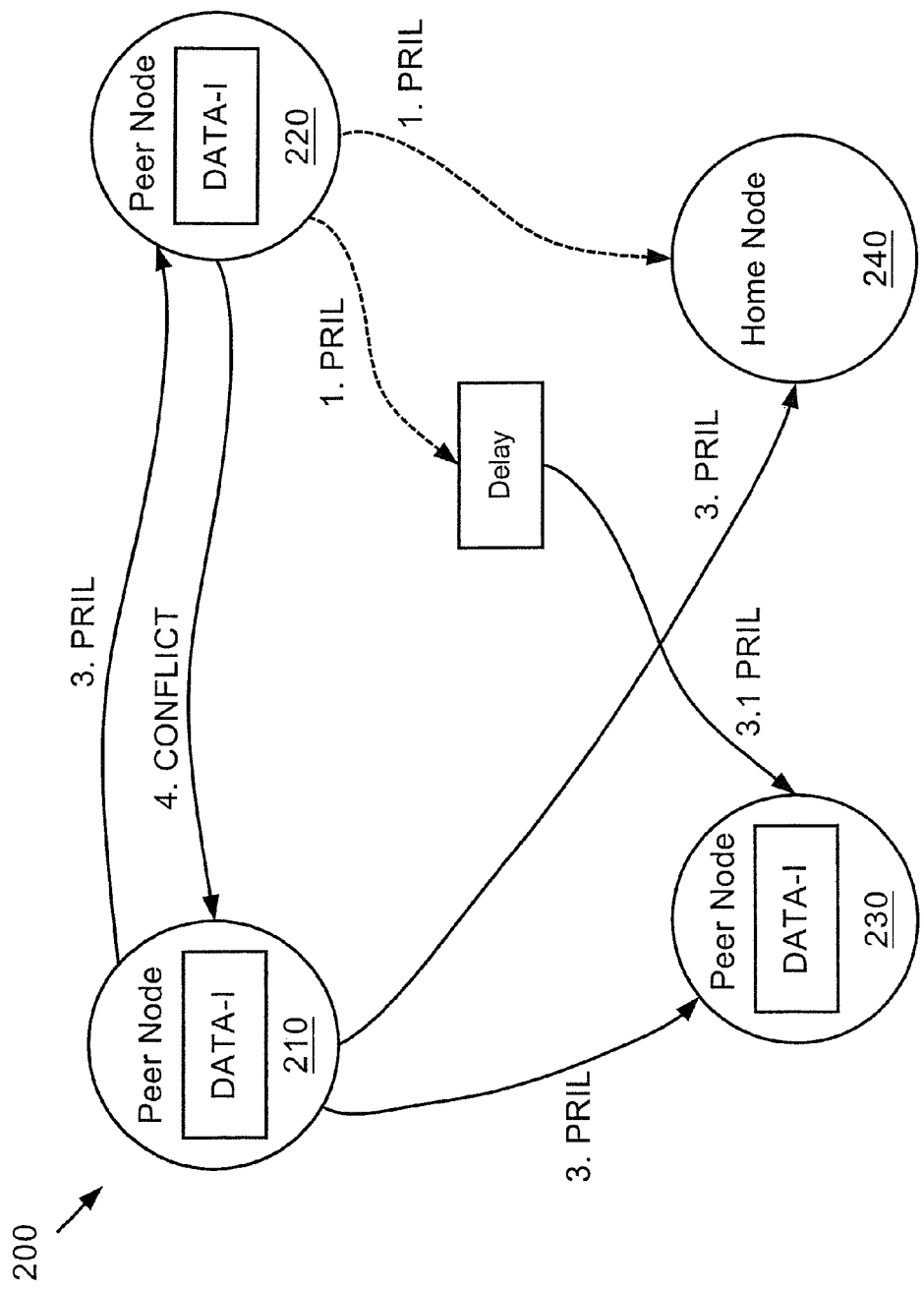

As illustrated in FIG. 6b, peer node 210 transmits a PRIL message to peer nodes 220 and 230 and to home node 240 requesting the same block of data. The delayed PRIL message from peer node 220 is received by peer node 230 at the same time or after the PRIL message from peer node 210. Peer node 220 responds to the PRIL message from peer node 210 with a CONFLICT message indicating to peer node 210 that peer node 220 has detected a conflict between requests by the two nodes.

Figure 6C:
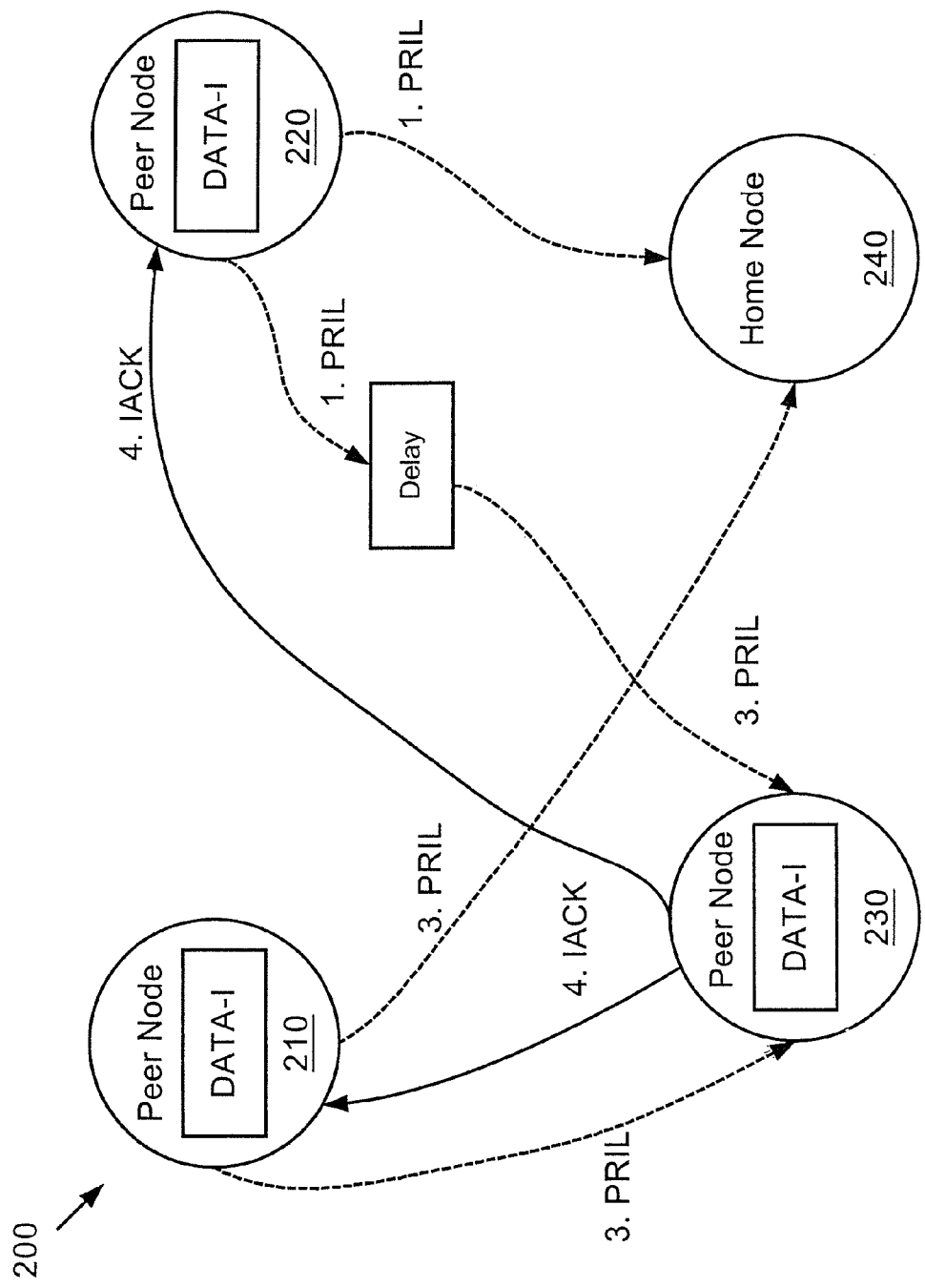

As illustrated in FIG. 6c, peer node 230 responds to the PRIL message from peer node 210 with an IACK message indicating that peer node 230 does not store a valid copy of the requested data by peer node 210. Similarly, peer node 230 responds to the PRIL message from peer node 220 with an IACK message indicating that peer node 230 does not store a valid copy of the requested data by peer node 220.

Figure 6D:
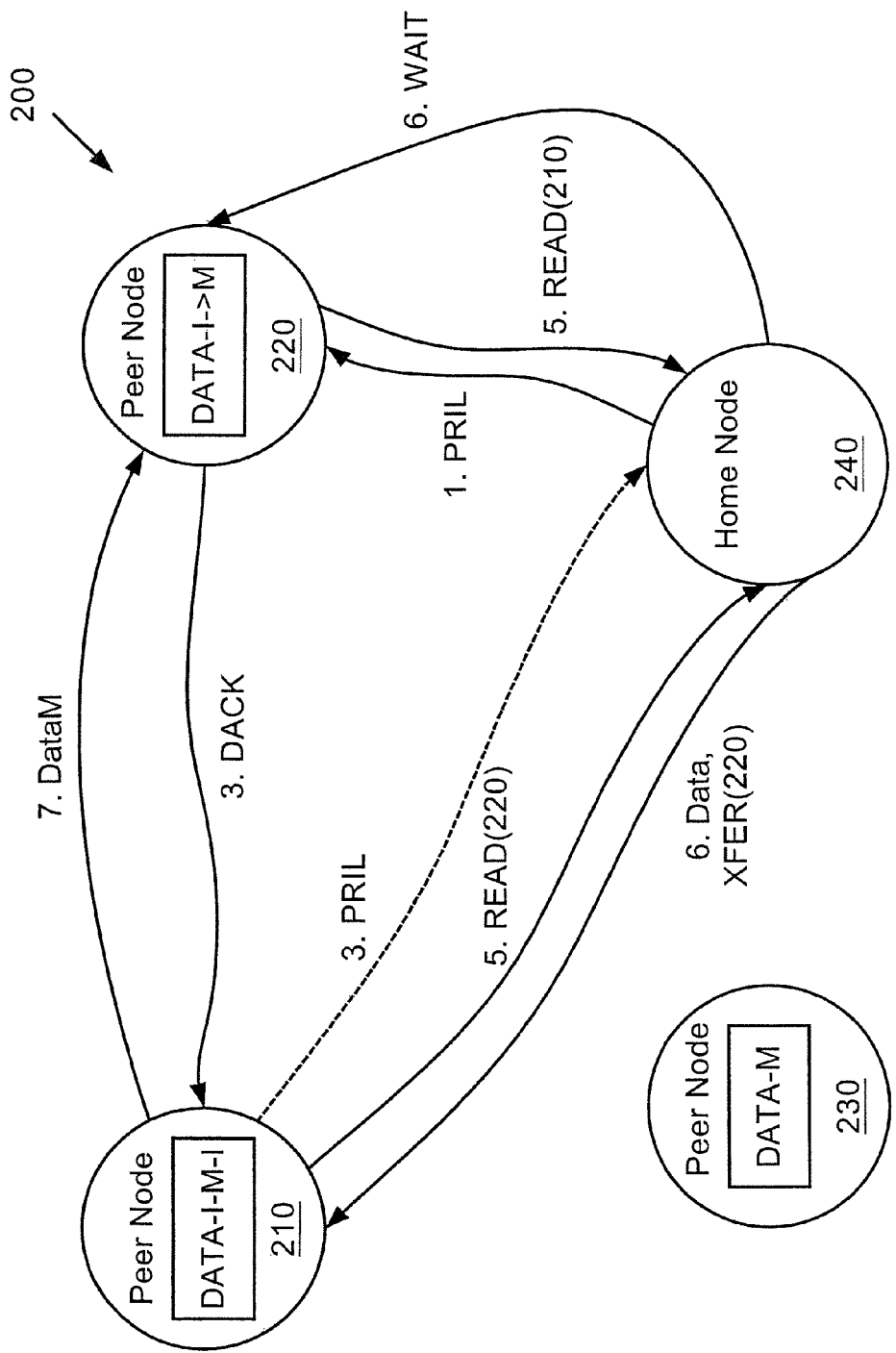

As illustrated in FIG. 6d, peer node 210 sends a READ(220) message to home node 240. The READ(220) message reads the previously requested data from home node 240, which has retrieved the requested data from memory. Home node 240 provides the requested data to peer node 210 with a Data,XFER(220) message.

After receiving the requested data, peer node 210 sends a copy of the requested data to peer node 220 with a DataM message. Any copy of the requested data retained by peer node 210 is marked in the I state. Peer node 220 stores the requested data in the M state and acknowledges receipt of the requested data with a DACK message to peer node 210.

Example Systems to Support Speculative Distributed Conflict Resolution

Figure 7:
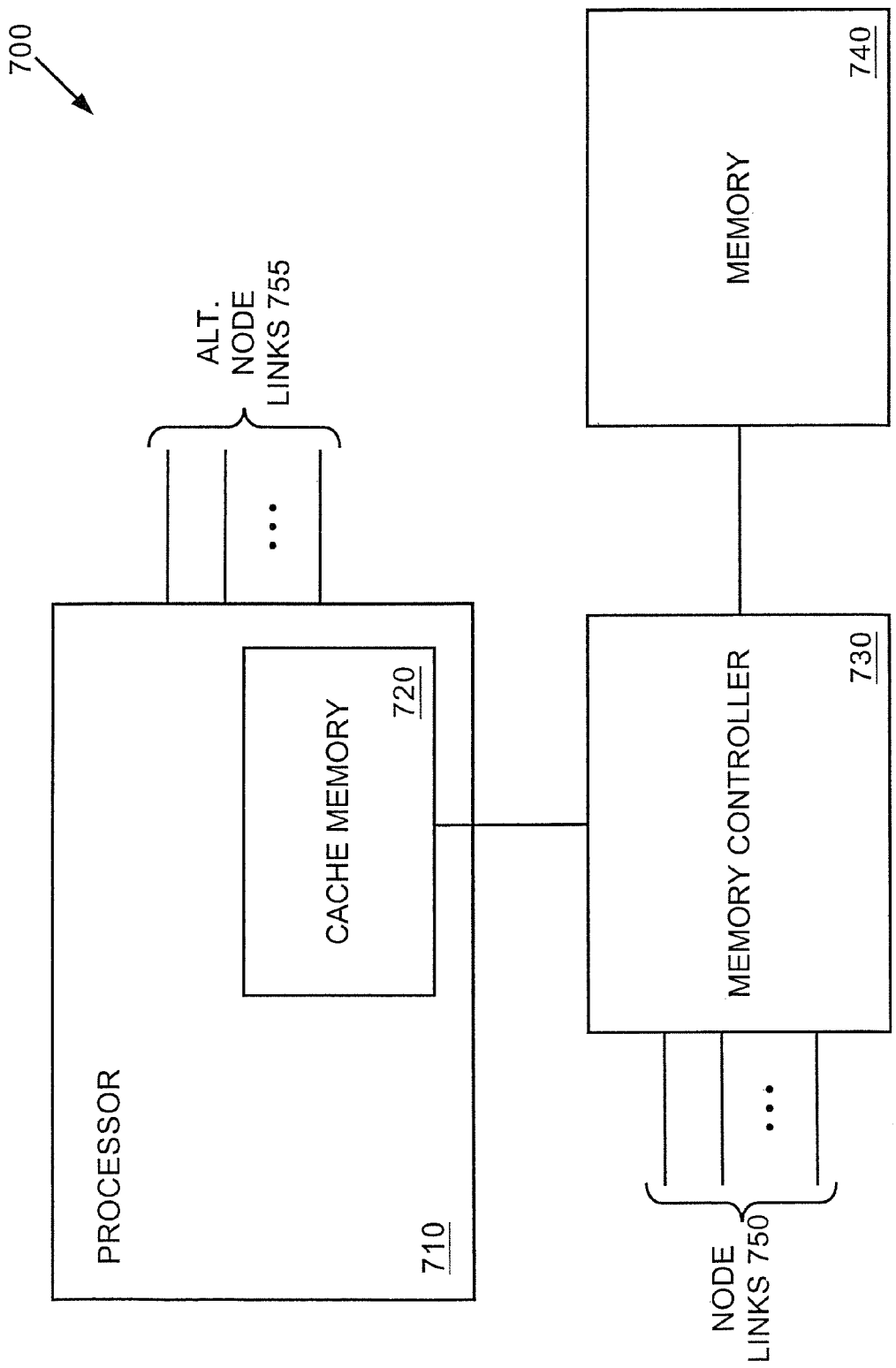
FIG. 7 is a block diagram of one embodiment of a node.

FIG. 7 is a block diagram of one embodiment of a node. Node 700 is illustrated with a single processor, cache memory, memory controller and memory; however, any number of any of these components can be included in a node. Further, additional and/or different components (e.g., a bus bridge) can also be included in a node.

Processor 710 can be any type of processor known in the art. In one embodiment, processor 710 includes cache memory 720. In alternate embodiments, cache memory 720 is external to processor 710, or additional cache memories can be included that are internal or external to processor 710.

Memory controller 730 is coupled with cache memory 720 and memory 740. Memory controller 730 operates as an interface between cache memory 720 and memory 740. In one embodiment, memory controller 730 maintains cache coherency according to the cache coherency protocol described herein. Memory controller 730 interacts with other nodes via node links 750. In an alternate embodiment, processor 710 interacts with memory controller 730 to maintain cache coherency as described herein and processor 710 interacts with other nodes via alternative node links 755.

In one embodiment, node links 750 include a dedicated interface for each node with which node 700 interacts. In an alternate embodiment, node links 750 include a number of interfaces that is different than the number of nodes with which node 700 interacts. In one embodiment, node 700 interacts with one or more agents that represent multiple nodes.

Figure 8:
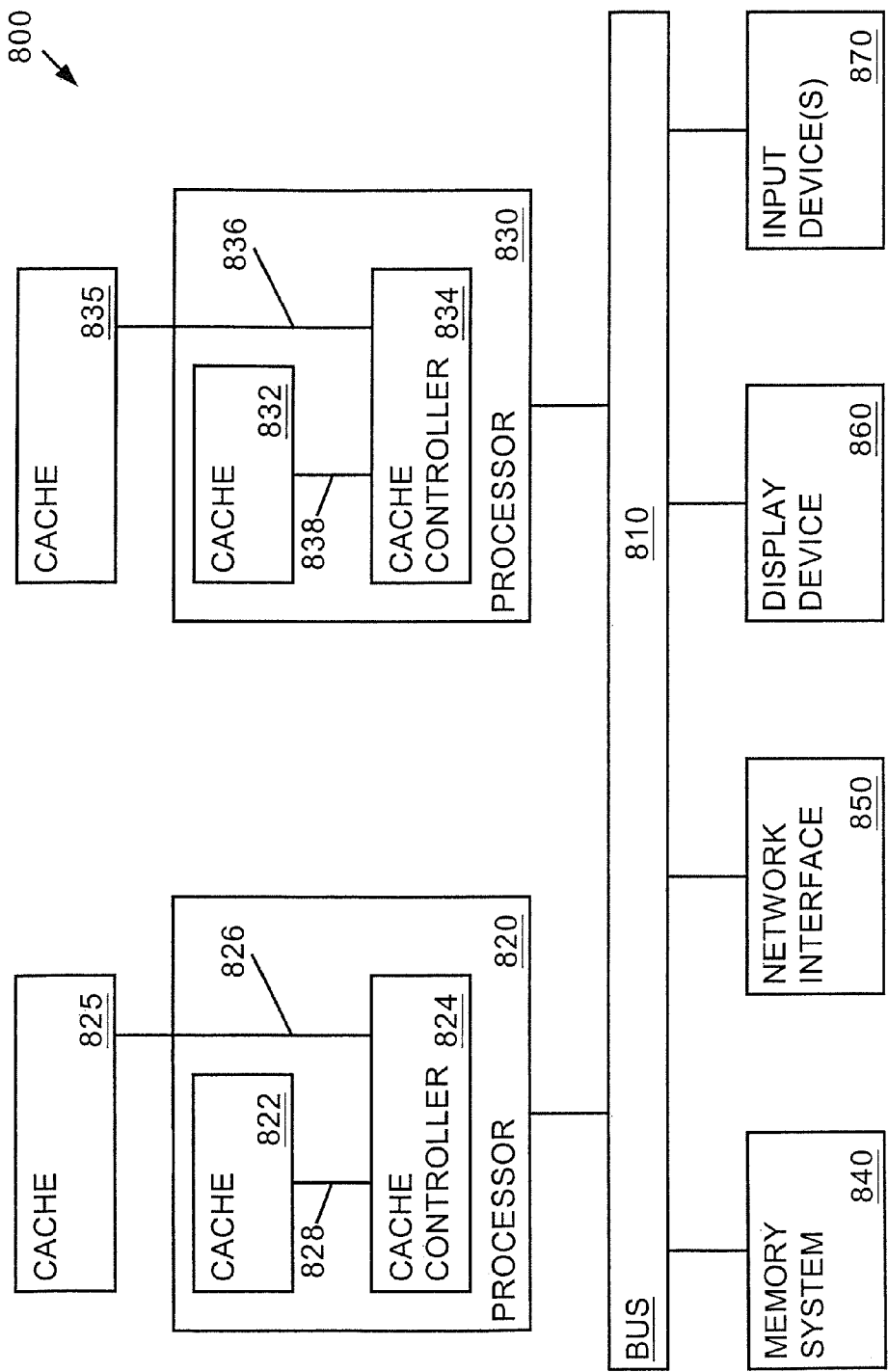
FIG. 8 is one embodiment of a multiprocessor system.

FIG. 8 is one embodiment of a multiprocessor system. Multiprocessor system 800 is intended to represent a range of systems having multiple processors, for example, computer systems, real-time monitoring systems, etc. Alternative multiprocessor systems can include more, fewer and/or different components. In certain situations, the cache management techniques described herein can be applied to both single processor and to multiprocessor systems. Multiprocessor system 800 can be configured to operate as a multi-node system.

Multiprocessor system 800 includes bus system 810 or other communication device(s) to communicate information. Bus system 810 can include any number of buses and associated interconnection circuitry, for example, bus bridges. Processor 820 is coupled with bus system 810 to process information. Processor 820 can include cache memory 822, for example a level zero (L0) cache memory, and cache controller 824. In one embodiment, processor 820 is also coupled with cache 825, which can be any type of cache memory. In an alternate embodiment, cache 825 can be coupled with bus system 810. Other types of processor-cache configurations can also be used.

In one embodiment, cache controller 824 is coupled with cache memory 822 via cache memory interface 828, which can be, for example, a bus internal to processor 820. Cache controller is coupled with cache memory 825 via cache interface 826, which provides an interface between processor 820 and an external cache memory.

Multiprocessor system 800 further includes processor 830 with cache memory 832 and cache controller 834. Cache controller 834 is coupled with cache memory 832 via cache interface 838. Similarly, cache controller 834 is coupled with cache memory 835 via cache interface 836. In one embodiment, cache memory 835 is coupled with processor 830.

While multiprocessor system 800 is illustrated with two processors, multiprocessor system 800 can include any number of processors and/or co-processors. Multiprocessor system 800 further includes memory system 840 coupled with bus system 810. Memory system 840 can include any combination of dynamic (e.g., random access memory) and static (e.g., read-only memory, CD-ROM, disk storage, flash memory) memory devices and associated drives, where appropriate. The memory devices of memory system 840 are used to store information and instructions to be executed by processors of multiprocessor system 800. Memory system 840 also can be used to store temporary variables or other intermediate information during execution of instructions by the processors.

Instructions can be provided to memory system 840 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Multiprocessor system 800 further includes network interface 850 to provide access to a network, such as a local area network and/or the Internet. Network interface 850 can provide wireless and/or wired network interfaces, which can include communication of instructions to and/or from remote electronically-accessible media. An electronically-accessible medium includes any mechanism that provides (i.e., stores and/or transmits) content (e.g., computer executable instructions) in a form readable by an electronic device (e.g., a computer, a personal digital assistant, a cellular telephone).

For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Multiprocessor system 800 can also include display device 860, such as a cathode ray tube (CRT) or liquid crystal display (LCD), to display information. Input device(s) 870, including, for example, a keyboard having alphanumeric and other keys, is typically coupled to bus 810 to communicate information and command selections to processors 820 and/or 830. Another type of user input device is a cursor control device, such as a mouse, a trackball, or cursor direction keys to communicate direction information and command selections to processors 820 and 830 and to control cursor movement on display device 860.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

Appendix A

Below are example descriptions of MESIF algorithms in pseudo-code format. Descriptions are packet-based; i.e., each routine is executed in response to an incoming or outgoing packet. Alternatively, the algorithms can be described as a reaction to a state change due to a packet being received or generated.

To simplify the descriptions, the following assumptions are made:
1. Each peer/requester node has a single caching agent;
2. Home nodes do not have caching agents; and
3. Algorithms for memory requests in home nodes can be more complex than indicated and handle all of the corner cases MESIF induces (more than one read, multiple epochs, write forwarding, etc.).

The case of a home node having a caching agent (as can occur in some embodiments) is derived from the given algorithms, namely, by combining the routines for received packets by internalizing routines involving transmissions to/from the home node by a local caching agent (or proxy).

In one embodiment, caches obey the following constraints:
1. Cache will generate PRL only if line is in I state.
2. Cache will generate PRIL only if line is in I or S state.
3. Cache will generate PWL only if line is in M state.
4. Cache may freely transition to I state from S, F, and E states.
5. Cache may freely transition to M state from E state (presuming a write occurred.)
6. Cache may otherwise transition only upon completion of a request it issued or in receipt of a request from a peer.

The base protocol described below covers only PRL, PRIL, and PWL requests and uses the conflict resolution method involving a conflict list being passed along with transferred data. Extensions and options to this base protocol are covered in the following sections.

Base Mesif Protocol

Request Generation
  Invocation:
  Cache generated new request for an (inactive) address
  Algorithm:

---
  Mark address as being active
  If request is PRL or PRIL
    Send request to all other peer nodes and to home node
  If request is PWL
    Send request to home node
---

Request Reception by Home Node
  Invocation:
  Request received at home node
  Algorithm:

---
  If request is PWL
    Initiate write to memory
    (Handle forwarding, canceling outstanding reads, etc.)
    Send ACK back to requester
  If request is PRL or PRIL
    Initiate read from memory
    (Buffer data if read finishes before a READ is received, etc.)
---

Request Reception by Peer Node
  Invocation:
  Request (PRL or PRIL) received at a peer node
  Algorithm:

---
If address is being forwarded
    Buffer incoming request
Else if address is not active
    Snoop cache
Else if address is active
    If active request is a PWL
        Buffer incoming request
    -- End If
    If incoming request is in active request's conflict list
        If active request is a PRL
            Respond with CNFL
        Else (active request is a PRIL)
            Respond with CNFLI
    Else if active request is in "data phase" (see Gathering Responses below)
        Buffer incoming request
    Else
        Add requester to conflict list (of active request)
        If incoming request is a PRIL
            Mark requester in conflict list as a PRIL conflictor
        If active request is a PRL
            Respond with CNFL
        Else (active request is a PRIL)
            Respond with CNFLI
---

Snoop Responses
  Invocation:
  Request submitted (as a snoop) to cache for proper response generation
  Algorithm:
  Look up response and next state in table below based upon current cache state and incoming request type (next state of S/I means the cache can move the line to either state; note: still send DATA_F for PRLs even if invalidating local copy—see PRL DATA_E/M Reponse option below)

|       | Response |        | Next State |      |
|-------|----------|--------|------------|------|
| State | PRL      | PRIL   | PRL        | PRIL |
| I     | IACK     | IACK   | I          | I    |
| S     | SACK     | IACK   | S/I        | I    |
| F     | DATA_F   | DATA_E | S/I        | I    |
| E     | DATA_F   | DATA_E | S/I        | I    |
| M     | DATA_F   | DATA_M | S/I        | I    |

---
If PRL snoop hits cache line in M state
    Initiate PWL request
    Buffer snoop (hold off sending DATA_F until writeback completes)
Else
    If snoop hit cache line (in M, E, or F state)
        Mark address as being forwarded
    Change cache line to next state
    Send response to requester
---

Gathering Responses
    Invocation:
    PRL/PRIL request received a response from a peer node
    Algorithm:

```
If response is a SACK (PRL only)
    Record existence of shared copy in system
Else if response is a DATA
    Record receipt of forwarded data from responding node
    Send cache line and new state to cache (note: line is not yet
        globally observable!)
Else if response is CNFL
    Add responding node to conflict list
Else if response is CNFLI
    Add responding node to conflict list
    Mark responding node as PRIL conflictor
-- End If
If all peer nodes have responded
    Mark request as being in "data phase"
    If a data response was received
        Send CNCL, forwarding node, and conflict list to home node
    Else
        Send READ and conflict list to home node
```

Cancel at Home Node
    Invocation:
    Home node received a CNCL (contains forwarding node and conflict list)
    Algorithm:

```
Cancel outstanding read (if any)
Mark requesting node as "current owner" for this address
Send DACK to forwarding node
If no conflicts
    Send ACK to requesting node
    -- conflictless cached epoch is complete
Else
    Incorporate conflict list as "outstanding requests" for this address
    -- wait for READs to XFR data to
```

Read Request at Home Node
    Invocation:
    Home node received a READ (contains conflict list)
    Algorithm:

```
If no current owner
    If data not available
        Wait for read to complete
    Send DATA_E to requesting node
    If conflict list is empty
        Send ACK to requesting node
        -- conflictless uncached epoch is complete
    Else
        Incorporate conflict list as "outstanding nodes" for this address
Else
    Add outstanding conflicts to "outstanding nodes" for this address
    Remove requesting node from "outstanding nodes"
    If no (remaining) outstanding nodes
        Send XFR (target: requesting node) to "current owner"
        Send ACK to requesting node
        -- epoch is complete
    Else
        If one or more outstanding nodes (including requester) is a PRIL
            Send XFRI (target: requesting node) to "current owner"
        Else
            Send XFR (target: requesting node) to "current owner"
        Mark requesting node as "current owner"
```

Transfer Reception
    Invocation:
    Requester received a XFR or XFRI (contains target node)
    Algorithm:

```
Wait for data if not yet received
If received XFRI
    Send PRIL snoop to cache
Else
    Send PRL snoop to cache
Add conflict list (sans receiving node) to DATA packet
Send DATA packet to target node
```

Transferred Data Reception
    Invocation:
    Requester received DATA (contains conflict list) as a result of a XFR
    Algorithm:

```
Send data to processor
Incorporate conflict list into current conflict list
If buffering requests matching entry in conflict list
    Respond with CNFL to each matching request
```

Forwarding DACK
    Invocation:
    Forwarding node received a DACK
    Algorithm:
    Unmark address as being forwarded
    Service buffered requests per algorithm for receiving peer requests
Request ACK
    Invocation:
    Requester received an ACK from home node
    Algorithm:

```
If active request is a PWL
    Switch cache line to desired next state (E or I)
    If buffered snoop (PRL hit line in M state)
        Send DATA_F to requester
        Change cache line to next state (S) or to I state
Else (request is a PRL or PRIL)
    Release buffered requests (i.e., treat them as though they
        just arrived at the node)
    Wait for data if not yet received
    Send ACK to processor
```

<<<===END OF BASE PROTOCOL===>>>

PIL Request

In the protocol algorithms above the only way for a node to move a cache line from the F state to the E state is to invalidate the line (change line to I state) and then request a PRIL. This involves a DATA transfer.

To support direct F→E transition, a PIL request can be used. This request, sent to all peer nodes and the home node, and causes other caches to invalidate their shared copies of the line. To prevent in-flight PRILs and/or PRLs from interfering with the transition, PILs can be given higher priority.

Changes to Base Protocol:
Request Generation
   Invocation:
   Cache generated new request for an (inactive) address
   Algorithm:

```
            Mark address as being active
            If request is PRL or PRIL
                Send request to all other peer nodes and to home node
>>          If request is PIL
>>              Send request to all other peer nodes
            If request is PWL
                Send request to home node
```

Request Reception by Peer Node
   Invocation:
   Request (PRL or PRIL) received at a peer node
   Only change to algorithm is to buffer request if there is an active PIL request, as is done with an active PWL.
PIL Request Reception by Peer Node
   Invocation:
   PIL request received at a peer node
   Algorithm:
   Send PIL snoop to cache
Snoop Responses
   Same algorithm used with new Response/Next-State table (no entries for F, E, and M with PILs because requester in F and F, E, and M are mutually exclusive)

|       | Response |        |      | Next State |      |     |
|-------|----------|--------|------|------------|------|-----|
| State | PRL      | PRIL   | PIL  | PRL        | PRIL | PIL |
| I     | IACK     | IACK   | IACK | I          | I    | I   |
| S     | SACK     | IACK   | IACK | S/I        | I    | I   |
| F     | DATA_F   | DATA_E |      | S/I        | I    |     |
| E     | DATA_F   | DATA_E |      | S/I        | I    |     |
| M     | DATA_F   | DATA_M |      | S/I        | I    |     |

Gathering Responses
   Invocation:
   PIL request received a response from a peer node
   Algorithm:

```
    If all peer nodes have responded
        Tell cache to move line to E state
        Release any buffered requests
        -- PIL request is complete
```

M->S PWL and Immediate Response

A performance issue with PRLs hitting a line in M state is the need to writeback (issue a PWL) before forwarding the data. With some subtle changes, the data can be forwarded and written back simultaneously. The home node does not send the DACK until it has received both the PWL request and the CNCL from the requester/winner.

Changes to Base Protocol:
Request Reception by Home Node
   Invocation:
   Request received at home node
   Algorithm:

```
        If request is PWL
            Initiate write to memory
            (Handle forwarding, canceling outstanding reads, etc.)
>>          If PWL was for PRL-hit-M
>>              If CNCL received
>>                  Send DACK to forwarding node indicated in
                        CNCL
>>              Else
>>                  Mark address as being written back
>>          Else
>>              Send ACK back to requester
        If request is PRL or PRIL
            Initiate read from memory
            (Buffer data if read finishes before a READ is received, etc.)
```

Snoop Responses
   Invocation:
   Request submitted (as a snoop) to cache for proper response generation
   Algorithm:

```
    Do response/next-state look up as in base protocol
    If snoop hit cache line (in M, E, or F state)
        Mark address as being forwarded
        Change cache line to next state
    If PRL snoop hits cache line in M state
        Initiate PWL marked as PRL-hit-M writeback
        Send DATA_F to requester, marked as PRL-hit-M
    Else
        Send response to requester
```

Gathering Responses
   Algorithm:

```
    Differences are in recording PRL-hit-M data and notifying home node
of the special forwarding when sending the CNCL:
        Else if response is a DATA
            Record receipt of forwarded data from responding node
            If PRL request and hit M (indicated via DATA)
                Mark forwarding node as PRL-hit-M
            Send cache line and new state to cache (note: line is not yet
                globally observable!)
    If all peer nodes have responded
        If a data response was received
            Send CNCL, forwarding node (marked as PRL-hit-M if it
                was), and conflict list to home node
```

Cancel at Home Node
   Invocation:
   Home node received a CNCL (contains forwarding node and conflict list)
   Algorithm:

```
    Only difference is in determining whether to send a DACK:
        If forwarding node did PRL-hit-M writeback
            If PWL has been received
                Send DACK to forwarding node
            Else
                Mark address as needing writeback
        Else
            Send DACK to forwarding node
```

Forwarding DACK

No differences. The issued PWL is treated as a one-shot packet (or a request finished by the DACK.)

FM State

Another alternative for PRLs hitting a line in M state is to introduce the FM state to MESIF. This state indicates shared copies of a modified line. As with the M state, the data must be written back (PWL) if evicted from the cache. As with the F state, the data cannot be changed and the node responds with hits for read requests on the line.

When a node with the line in M state receives a PRL, it responds with DATA_FM instead of issuing a PWL and responding with DATA_F.

Transitioning from FM to M is not allowed except via a PIL. Changing from FM to E directly is not allowed.

Changes to Base Protocol:

Snoop Response

Invocation:
Request submitted (as a snoop) to cache for proper response generation Algorithm:
Look up response and next state in table below based upon current cache can state and incoming request type (next state of S/I means the cache can move the line to either state; note: still send DATA_F(M) for PRLs even if invalidating local copy—see PRL DATA_E/M Reponse option below)

|       | Response |         |      | Next State |      |     |
|-------|----------|---------|------|------------|------|-----|
| State | PRL      | PRIL    | PIL  | PRL        | PRIL | PIL |
| I     | IACK     | IACK    | IACK | I          | I    | I   |
| S     | SACK     | IACK    | IACK | S/I        | I    | I   |
| F     | DATA_F   | DATA_E  |      | S/I        | I    |     |
| E     | DATA_F   | DATA_E  |      | S/I        | I    |     |
| M     | DATA_FM  | DATA_M  |      | S/I        | I    |     |
| FM    | DATA_FM  | DATA_M  |      | S/I        | I    |     |

If snoop hit cache line (in M, E, or F state)
    Mark address as being forwarded
Change cache line to next state
Send response to requester Conflictless Data Sending a conflict list with transferred data is problematic for hardware. It is possible to avoid this conflict list if requests in the middle of transfer chains know they are in the middle and are allowed to respond to buffered requests (with IACK/SACK) after receiving transferred data. This allows all other conflicting nodes to make further progress, thus getting remaining READs to the home node.

With this option, requests (PRL and PRIL, i.e., read requests) go through four phases:
1) Send phase—sending requests
2) Gather phase—gathering responses (followed by sending READ or CNCL)
3) Data phase—waiting for data
4) Hold phase—in middle of conflict chain, hold data until XFR, send IACK/SACK to buffered and incoming requests In this embodiment, a request will know it is in the middle of the chain if there is no piggybacked ACK on the transfered DATA. Only this hold phase is different from the base protocol. In fact, the base protocol's data phase either stays the same (for conflictless requests or requests at the end of the epoch/conflict chain) or is divided into two phases, the first still being the data phase and the second now being the hold phase ending when the XFR is received.

Changes to Base Protocol:

Request Reception by Peer Node

Only change to algorithm is to check if there is an active request in its hold phase:

---

If address is being forwarded
    [same as before]
Else if address is not active
    [same as before]
Else if address is active
    If active request is a PWL
        [same as before]
    If incoming request is in active request's conflict list
        [same as before]
    Else if active request is in "hold phase"
        If incoming request is a PRL
            Respond with SACK (or IACK if previous PRIL got an IACK)
        Else -- incoming request is a PRIL
            Mark active request as needing to invalidate
            Respond with IACK
    Else if active request is in "data phase"
        [same as before]
    Else
        [same as before]

---

Gathering Response

Only change to this algorithm is that the request is complete if it sends a CNCL and its conflict list is empty. In other words, the system did a cache-to-cache transfer and there were no conflicts; the only thing left to do is notify home node, which does not need to be ACK'd.

Note: a CNCL'ing request (with conflicts) stays in data phase waiting for a XFR, i.e., it does not enter the hold phase.

Cancel at Home Node

Invocation:
Home node received a CNCL (contains forwarding node and conflict list)

Algorithm:

---

Cancel outstanding read (if any)
Mark requesting node as "current owner" for this address
Send DACK to forwarding node
If no conflicts
    -- conflictless cached epoch is complete
Else
    Incorporate conflict list as "outstanding requests" for this address
    -- wait for READs to XFR data to

---

Read Request at Home Node

Invocation:
Home node received a READ (contains conflict list)

Algorithm:

---

If no current owner
    If data not available
        Initiate read if necessary
        Wait for read to complete
    Send DATA_E to requesting node
    If conlict list is empty
        -- conflictless uncached epoch is complete -continued

```
    Else
        Incorporate conflict list as "outstanding nodes" for this address
        -- wait for READs to XFR data to
Else
    Add outstanding conflicts to "outstanding nodes" for this address
    Remove requesting node from "outstanding nodes"
    If no (remaining) outstanding nodes
        Send XFR+ACK (target: requesting node) to "current owner"
        -- epoch is complete
    Else
        If one or more outstanding nodes (including requester) is a PRIL
            Send XFRI (target: requesting node) to "current owner"
        Else
            Send XFR (target: requesting node) to "current owner"
        Mark requesting node as "current owner"
```

Transfer Reception

A change here (in addition to handling a XFR+ACK) is determining if during the hold phase an IACK response was spoofed for a PRIL. If so, the line is invalidated using the snoop.

Invocation:

Requester received a XFR, XFR+ACK, or XFRI (contains target node)

Algorithm:

```
Wait for data if not yet received
If received XFRI or request is marked as needing to invalidate
    Send PRIL snoop to cache
Else
    Send PRL snoop to cache
-- End If
If received XFR+ACK
    Send DATA+ACK packet to target node
Else
    Send DATA packet to target node
```

Transferred Data Reception

Invocation:

Requester received DATA or DATA+ACK as a result of a XFR (requester is in data phase, so it knows this is via a XFR)

Algorithm:

```
Send data to processor
If received DATA packet
    Move request to hold phase
    Foreach buffered request
        If buffered request is a PRL
            Respond with SACK (or IACK if previous PRIL got an IACK)
        Else -- buffered request is a PRIL
            Mark local request as needing to invalidate
            Respond with IACK
Else -- received DATA+ACK
    -- request is complete and epoch is complete
```

PRL DATA E/M Response

When a PRL snoop hits a cache line, it has to respond with DATA_F to maintain correctness, regardless of whether the cache transitions the line to S or I. It is possible to support sending a DATA_E when transitioning to I, but it requires an additional communication with the cache to let it know that the E state it received needs to be demoted to F. Basically, the algorithm is that if the node has already received a DATA_E then receives an SACK, it must change the cache state from E to F.

The invention claimed is:

1. A computer-implemented method comprising:
transmitting, from a first peer node to a plurality of nodes of a multi-node system, a first data request message to request a copy of a block of data, wherein the plurality of nodes having peer nodes including the first peer node and a second peer node, wherein the plurality of nodes further having a home node that stores the block of data in a non-cache memory;
transmitting, from the second peer node to the plurality of nodes, a second data request message to request a copy of the block of data;
determining a conflict between the first data request message and the second data request message corresponding to the first and second peer nodes, respectively, wherein the first and second peer nodes are regarded as conflicting nodes;
reporting the conflict to the home node to prepare a piggyback report to be transmitted to a third peer node, the piggyback report having a first message indicating the conflict between the first and second peer nodes, and a second message instructing the third peer node to transfer a copy of the block of data to the first peer node; and
transmitting, from the home node to the first peer node, the piggyback report instructing the first peer node to share with the second peer node the copy of the block of data received from the third peer node.

2. The computer-implemented method of claim 1, further comprising changing a state of the block of data, if any, retained by the first and second peer nodes.

3. The computer-implemented method of claim 1, wherein the block of data comprises a cache line.

4. The computer-implemented method of claim 1, further comprising transmitting the first data request message to a first agent representing the plurality of nodes.

5. The computer-implemented method of claim 1, further comprising transmitting the second data request message to a second agent representing the plurality of nodes.

6. The computer-implemented method of claim 1, further comprising once the conflict is determined, initiating a blackout period for responding to the first and second data request messages until an acknowledgement message is received from the home node guaranteeing that the conflicting nodes are aware of the conflict.

7. A processor comprising:
a control circuit to transmit a first data request message from a first peer node to a plurality of nodes of a multi-node system to request a copy of a block of data, wherein the plurality of nodes having peer nodes including the first peer node and a second peer node, wherein the plurality of nodes further having a home node that stores the block of data in a non-cache memory, the control circuit to transmit a second data request message from the second peer node to the plurality of nodes to request a copy of the block of data, and determine a conflict between the first data request message and the second data request message corresponding to the first and second peer nodes, respectively, wherein the first and second peer nodes are regarded as conflicting nodes, and the control circuit is further to report the conflict to the home node,
wherein the home node to prepare a piggyback report to be transmitted to a third peer node, the piggyback report having a first message indicating the conflict between the first and second peer nodes, and a second message instructing the third peer node to transfer a copy of the block of data to the first peer node, the home node is further to transmit the piggyback report to the first peer node, the piggyback report instructing the first peer node to share with the second peer node the copy of the block of data received from the third peer node.

8. The processor of claim 7, wherein the control circuit is coupled to an interface that is coupled to the plurality of peer nodes and the home node, wherein the first, second and third peer nodes are coupled with other peer nodes.

9. The processor of claim 7, wherein each node of the plurality of peer nodes is represented by one or more peer agents.

10. The processor of claim 7, wherein the home node is represented by a home agent.

11. The processor of claim 7, wherein the control circuit is further to initiate a blackout period for responding to the first and data request messages until an acknowledgement message is received from the home node guaranteeing that the conflicting nodes are aware of the conflict.

12. A system comprising:
an interface coupled with a plurality of peer nodes and a home node; and
a processor having a control circuit coupled to the interface, the processor to transmit a first data request message from a first peer node to the plurality of nodes of a multi-node system to request a copy of a block of data, wherein the plurality of nodes having peer nodes including the first peer node and a second peer node, wherein the plurality of nodes further having the home node that stores the block of data in a non-cache memory, the processor is further to transmit a second data request message from the second peer node to the plurality of nodes to request a copy of the block of data, and determine a conflict between the first data request message and the second data request message corresponding to the first and second peer nodes, respectively, wherein the first and second peer nodes are regarded as conflicting nodes, and the processor is further to report the conflict to the home node,
wherein the home node to prepare a piggyback report to be transmitted to a third peer node, the piggyback report having a first message indicating the conflict between the first and second peer nodes, and a second message instructing the third peer node to transfer a copy of the block of data to the first peer node, the home node is further to transmit the piggyback report to the first peer node, the piggyback report instructing the first peer node to share with the second peer node the copy of the block of data received from the third peer node.

13. The system of claim 12, wherein the first and second peer nodes are coupled with other peer nodes.

14. The system of claim 12, wherein each node of the plurality of peer nodes is represented by one or more peer agents.

15. The system of claim 12, wherein the home node is represented by a home agent.

16. The system of claim 12, wherein the processor is further to initiate a blackout period for responding to the first and second data request messages until an acknowledgement message is received from the home node guaranteeing that the conflicting nodes are aware of the conflict.

* * * * *